United States Patent
White et al.

(10) Patent No.: US 8,122,392 B2
(45) Date of Patent: Feb. 21, 2012

(54) ROBUST DESIGN USING MANUFACTURABILITY MODELS

(75) Inventors: David White, San Jose, CA (US); Louis K. Scheffer, Campbell, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 712 days.

(21) Appl. No.: 12/147,436

(22) Filed: Jun. 26, 2008

(65) Prior Publication Data

US 2009/0031271 A1    Jan. 29, 2009

Related U.S. Application Data

(60) Provisional application No. 60/946,656, filed on Jun. 27, 2007.

(51) Int. Cl.
  *G06F 17/50*    (2006.01)
(52) U.S. Cl. ............... 716/54; 716/51; 716/52; 716/56; 716/112
(58) Field of Classification Search ............ 716/51, 716/52, 54, 56, 112, 113
  See application file for complete search history.

(56) References Cited

U.S. PATENT DOCUMENTS

| | | | |
|---|---|---|---|
| 5,646,870 A | 7/1997 | Krivokapic et al. | |
| 5,822,218 A | 10/1998 | Moosa et al. | |
| 7,159,198 B1 | 1/2007 | Ip et al. | |
| 7,325,206 B2 * | 1/2008 | White et al. | 716/53 |
| 2003/0177455 A1 | 9/2003 | Kaufman et al. | |
| 2003/0229881 A1 * | 12/2003 | White et al. | 716/19 |
| 2003/0237064 A1 | 12/2003 | White et al. | |
| 2005/0251771 A1 | 11/2005 | Robles | |
| 2007/0055487 A1 * | 3/2007 | Habitz et al. | 703/19 |

OTHER PUBLICATIONS

International Search Report and Written Opinion dated Oct. 22, 2008 for PCT/US2008/68425.
Foreign Office Action and translations dated Sep. 28, 2011 for Chinese Application No. 200880104046.0.

* cited by examiner

*Primary Examiner* — Vuthe Siek
(74) *Attorney, Agent, or Firm* — Vista IP Law Group, LLP.

(57) ABSTRACT

The present invention allows for a robust design using manufacturability models. A method, system and/or computer usable medium may be provided in an integrated circuit design to track sensitivity to a variation of process from wafer to wafer and/or fab to fab in order to assist the designers to anticipate the variations to improve the final yield of the products.

31 Claims, 19 Drawing Sheets

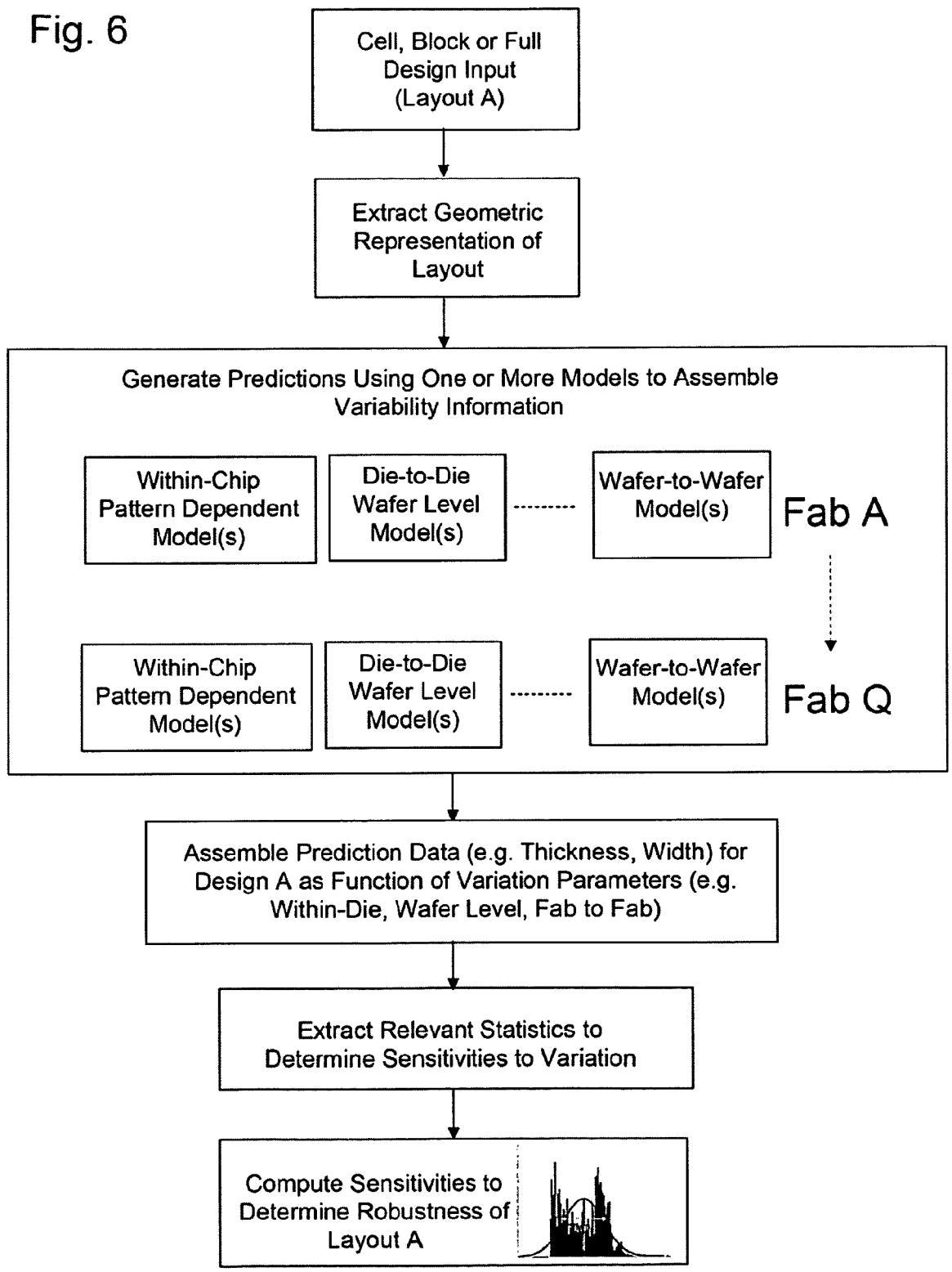

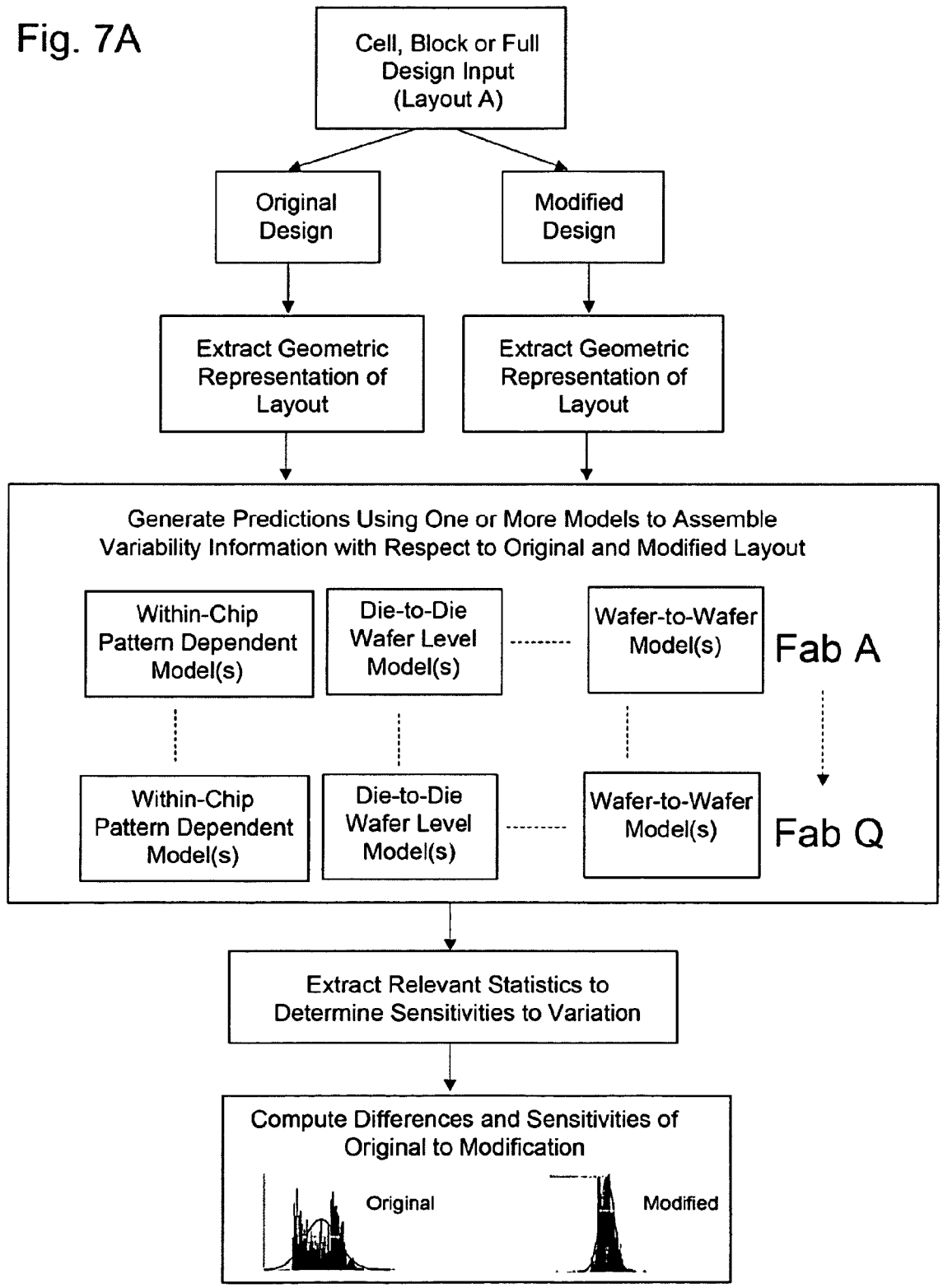

ROBUST DESIGN USING MANUFACTURABILITY MODELS

CROSS-REFERENCE TO RELATED APPLICATION

The present application claims the benefit of U.S. provisional application 60/946,656 filed Jun. 27, 2007, which is hereby incorporated by reference in its entirety.

FIELD OF THE INVENTION

The invention relates to Integrated Circuit (chip) design.

BACKGROUND

In design for manufacturing (DFM) of integrated circuit (IC), information from the manufacturing of the wafers is provided to the designers in order to improve the final yield of the products. However, variations in the fabrication process make it practically impossible to provide any useful information for the designers to anticipate these variations. Therefore, what is needed is a method and system to track sensitivity to variation of process from wafer to wafer, fab to fab.

SUMMARY

The present invention includes a robust design using manufacturability models. A method, system and/or computer usable medium may be provided in an integrated circuit design to track sensitivity to variations of process from wafer to wafer or fab to fab to assist the designers to anticipate these variations in order to improve the final yield of the products.

One embodiment includes identifying one or more models that characterizes variation in integrated circuit feature dimensions resulting from interactions between one or more fabrication processes and designed patterns or features on a section of one or more integrated circuit designs. The characterized variation may be combined from multiple models to generate a conditional distribution, range or a statistical measure of variation data in one or more geometric parameters of the design.

In other embodiments, the fabrication processes may represent one or more processing tools or flow within single fabrication facility or from multiple fabrication facilities. The fabrication process may include one or more models of the chemical mechanical polishing, etch, lithography, deposition, implantation or electroplating processes used in the creation of a semiconductor device. In other embodiments, the variation may be characterized for one or more of the following: variation within a single chip due to design pattern and fabrication process interaction, wafer level or die-to-die variation, wafer-to-wafer variation for a single tool or flow, tool or flow specific variation measurements, or fabrication facility specific variation measurements. In other embodiments, the sensitivity may be assess of a given design or block to the model characterized variation or a statistical characteristic of characterized variation such as range, maximum values, minimum values, standard deviation or mean using one of more distributions. In other embodiments, multiple variants of a given integrated circuit design are characterized and their sensitivities may be compared, a level of robustness may be determined or the results may be used as part of a scoring process.

Some embodiments may be used to select one design variant over another or to suggest further modifications to the integrated circuit design. Some embodiments may be used in part to characterize the electrical impact including the computation of resistance, capacitance or inductance for the geometric parameters of the design. Some embodiments may be used to determine shape or location of wires during routing, determine shape and location of dummy fill within the design, generate design rules, design rule violations, predict or assess yield associated with any design that contains the section, generate layout patterns for pattern based hotspot matching, simulate the electrical impact of the variation, compute statistical timing values, create or modify corner cases for RC extraction, compute resistance, capacitance or inductance for any part of the section, evaluate the sensitivity of the section to the environment, modify any part of the layout contained in the section, reduce the sensitivity of the section or any part of the layout within the section to the environment, evaluate one or more levels of a design, create dummy fill shapes and patterns, evaluate the electrical impact of the environment on the section including analysis of timing, power and signal integrity, as part of statistical timing analysis, select embedded third-party IP, evaluate embedded third-party IP, perform physical verification as part of a design process, creating the routing of a design or as part of post-route optimization of a design, or to assess a section of design during any stage of the electronic design process.

Another embodiment includes identifying one or more models that characterizes variation in integrated circuit feature dimensions resulting from interactions between one or more fabrication processes and designed patterns or features on a section of one or more integrated circuit designs. A context or environment with the section of the design and the one or more models to simulate interactions between the section and the environment may be provided. The results of simulating the interactions in a computer usable medium may be stored. The characterized variation from multiple models may be combined to generate a conditional distribution or a statistical measure of variation data such as maximum, minimum, mean, range or standard deviation values, in one or more geometric parameters of the design.

In some embodiments, the section of the design includes a cell, macro or block of a design. In some embodiments, the variation and geometric descriptions for one or more designs or section or block of a design may be stored in a computer usable medium and the use of data mining methods or statistical methods to retrieve and compute statistical information such as maximum, minimum or mean of one or more geometric parameters such as feature thickness or width.

Some embodiments may be used to simulate the impact of multiple variation sources and determine the robustness of a design, a section or block of a design, or set of design variants or modifications to the variation. Some embodiments may be used in part to select one design, block design variant or modification over another. Some embodiments may be used as part of comparing or selecting one or more fabrication facilities or sources. Some embodiments may be used as part of ensuring that a design or section of a design will meet the physical or electrical requirements for device or layout to be fabricated on a modeled flow. Some embodiments may be used to characterize the geometric shapes or elements that compose a critical net and form a variational description of the net, such as statistical distribution, maximum and minimum widths or thicknesses or another geometric or shape parameter. Some embodiments may be used to examine the sensitivity of the net to one or more sources of variation. Some embodiments may be used where the variation description is used with an extraction or solver to compute resistance, capacitance or inductance of one or more components of the net. Some embodiments may be used to determine a violation of a design rule or identify a hot spot.

Another embodiment includes the use one or more models that characterize variation in integrated circuit feature dimensions resulting from interactions between one or more fabrication processes. The characterization of designed patterns or features on a section of one or more integrated circuit designs may use one or more context environments. The characterization may examine one or more levels of the design. The characterization may be used to evaluate the design as shapes are defined, added, moved or modified.

In some embodiments, the fabrication process includes one or more models of the chemical mechanical polishing, etch, lithography, deposition, implantation or electroplating processes used in the creation of a semiconductor device. In other embodiments, the variation is characterized for one or more of the following: variation within a single chip due to design pattern and fabrication process interaction, wafer level or die-to-die variation, wafer-to-wafer variation for a single tool or flow, tool or flow specific variation measurements, or fabrication facility specific variation measurements.

Some embodiments may be used to determine design rule violations, modify or tighten design rules, determine shape or location of wires during routing, determine shape and location of dummy fill within the design, predict or assess yield associated with any design that contains the section, determine hotspot violations, simulate the electrical impact of the variation, compute statistical timing values, create or modify corner cases for RC extraction, compute resistance, capacitance or inductance for any part of the section, evaluate the sensitivity of the section to the environment, modify any part of the layout contained in the section, reduce the sensitivity of the section or any part of the layout within the section to the environment, evaluate one or more levels of a design, evaluate the electrical impact of the environment on the section including analysis of timing, power and signal integrity, as part of statistical timing analysis, select embedded third-party IP, evaluate embedded third-party IP, perform physical verification as part of a design process, creating the routing of a design or as part of post-route optimization of a design, or to assess a section of design during any stage of the electronic design process.

In other embodiments, models may be generated to predict geometric shapes in an electronic design. The models may be generated by combining variations that result from pattern interactions with the fabrication process with one or more of the following: die-to-die variation, tool-to-tool variation, wafer-to-wafer variation, fab-to-fab variation. In some embodiments, the models or predictions may be stored from the models in a computer usable medium. Other embodiments, may include using of the models to assess the impact of the variation on the physical or electrical properties of the electronic design or if also combined with device properties, an electronic device.

BRIEF DESCRIPTION OF THE DRAWINGS

FIG. 6 shows an approach for examining a newly designed cell, block or full design using one or more models according to an embodiment of the invention.

FIGS. 7A-B show an approach to generate the model predictions and to determine the robustness according to an embodiment of the invention.

DETAILED DESCRIPTION

Figure 1A:
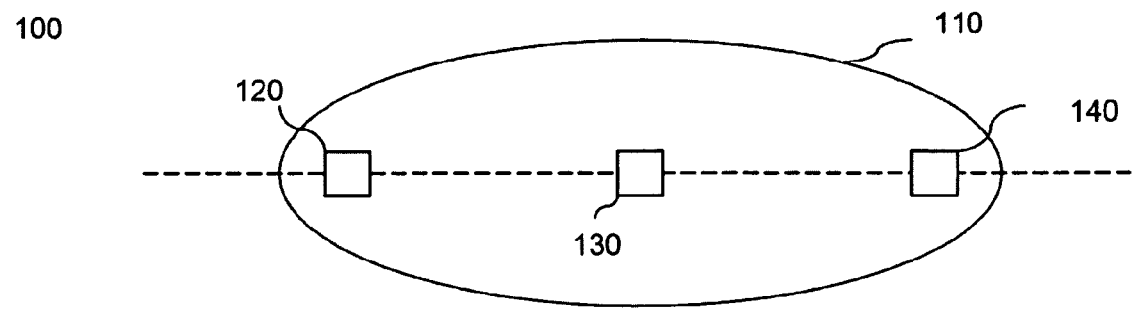
FIG. 1A illustrates a wafer according to an embodiment of the invention.

In general, designers or design tools will specify desired features such as line or gate dimensions within a layout. A series of manufacturing process steps are employed to try and reproduce the intended dimensions. However variability due to proximity of other features or patterns can result in within-chip variability where the same intended feature specified in the layout will be manufactured with different dimensions as a result of neighboring structures. Likewise, the same feature within the same chip design may be reproduced differently depending on the location of the die on the wafer. For CMP and etch, a radial influence is normally observed where dies along a given radius have similar die level manufacturing effects.

Additional variation may result as the processes drift over time. If the thickness for a given location within a die or chip were measured and plotted across all die from wafers manufactured over a significant time period the thickness would exhibit variation. As such, every shape or feature that a designer specifies results in a distribution when that shape or feature is manufactured.

The variation in the shapes and features will also result in a distribution of electrical performance. If the variability or distribution of that shape or feature was known, the designer may choose a shape or feature that is more resistant to variation or exhibit a distribution that will not cause undesirable effects.

The post manufacturing variability data may be measured and recorded in a database. However in many cases to create a statistically relevant sample, taking measurements can become too expensive or time consuming. Models can be created to predict the post manufacturing variability and the output of the models may be stored in a database. In some cases the amount of data will be voluminous and as such data mining methods may be used to extract statistically relevant information about variability for one or more variables. An example is interconnect wire thickness as a function of linewidth for a center and edge die on a wafer. The wire thickness may be influenced by surrounding pattern densities, the etch, deposition, plating and CMP processes used to create interconnect and the tool settings such as CMP zonal pressure controls in the tool head that influence the wafer level variation.

Once the models are used to compute predictions that are grouped into individual distributions, applied probability methods may be used to combine distributions and extract relevant statistical measurements such as standard deviation, range, mean or variance. For example the thickness distribution predicted using models from fab A and another using models from fab B, may need to be combined if a particular design is to be manufactured at both fabs and the variability of both fabs need to be considered during the design process. In this example, by assuming independence of the distributions, the combined distribution of thickness across fab A and fab B can be formed by convolving the two thickness distributions. In general, the combination of distributions that represent a sum of independent random variables, across fabs for example, is done by convolving the individual probability density or probability mass functions.

Examples of suitable convolution processes and other applicable methods to handling distributions are described in applied probability theory, such as disclosed in: Alvin Drake, "Fundamentals of Applied Probability Theory", McGraw-Hill, Classic Textbook Series, original publication in 1967, reissued in 1988. Additional data mining techniques may be used to extract relationships from the data generated by the predictions. These methods may include inductive logic programming, Bayesian methods, dynamic programming, and clustering methods using principal component analysis, partial least squares, or nearest neighbor. A general description of these methods can be found in: Usama Fayyad, et al., "Advances in Knowledge Discovery and Data Mining", MIT Press, 1996.

FIG. 1A illustrates a wafer for one embodiment of the invention 100. The wafer 110 includes a plurality of dies 120, 130 and 140. Edge dies 120 and 140 are located near the edges of the wafer and center die 130 is located near the center of the wafer. The thickness of the wafer is not equal across the whole wafer. There are two types of variations described. There is within die variation and die to die variation. The wafer level thickness variation resulting from CMP is normally radial. Specifically, the edge dies have similar wafer level properties while center die has different wafer level properties. This can be shown by plotting the thickness as illustrated by FIG. 1B.

Figure 1B:
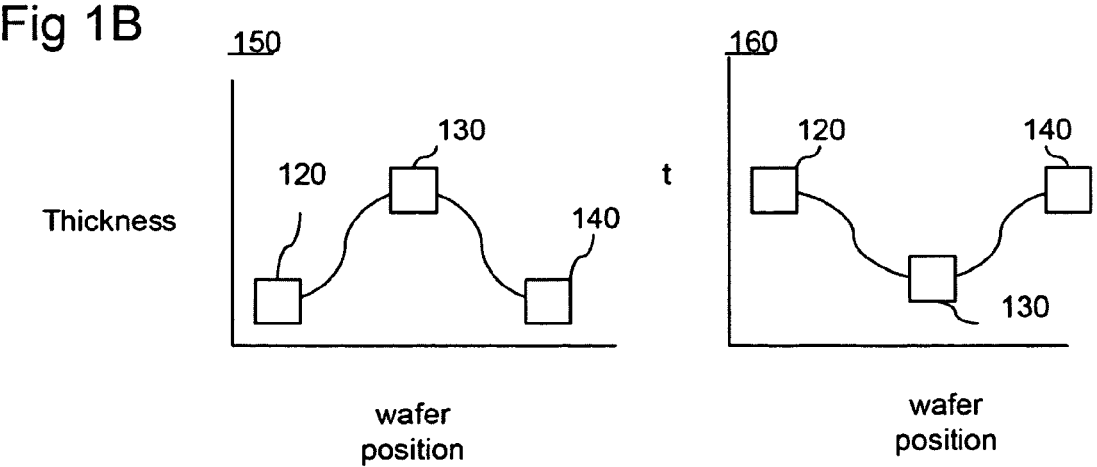
FIG. 1B graphically illustrates the relationship between the dies as a function of wafer position and thickness according to an embodiment of the invention.

FIG. 1B graphically illustrates the relationship between the dies as a function of wafer position and thickness for one embodiment of the invention. In one embodiment, the center of the wafer is thicker than the edges 150. In another embodiment, the edges are thicker than the center of the wafer 160. In another embodiment, the wafer level variation may be weighted by the number of die intersecting a given radial distance.

Figure 1C:
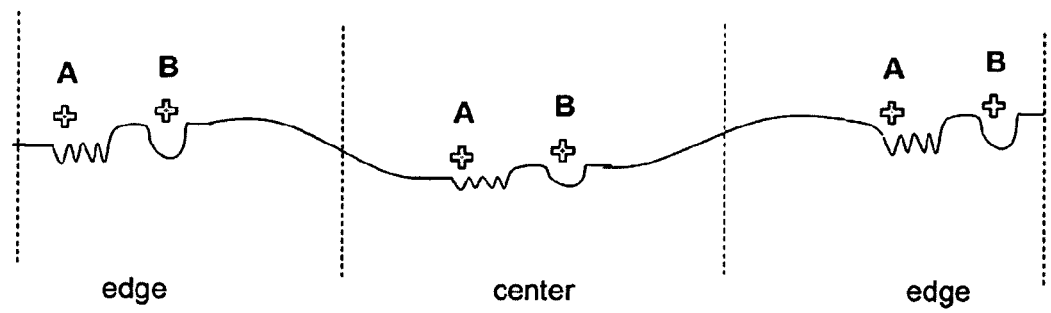
FIG. 1C illustrates a side view of a die at three locations along the wafer diameter, edge, middle and center positions according to an embodiment of the invention.

FIG. 1C illustrates a side view of a die at three locations along the wafer diameter, edge, middle and center positions. Thickness measurements are taken at point A and point B within each die. In one embodiment, measurement at point A is thinner than at point B. In another embodiment, the die could be measured one (edge) or more die locations. The thickness measurements are taken for a sampling of dies on the wafer. In another embodiment, in order to predict thickness for one or more die from lot to lot, thickness is taken on many different wafers and different lots. In another embodiment, the design may be outsourced to two fabrication sources are used and as such measurements are acquired from different fabs.

Figure 1D:
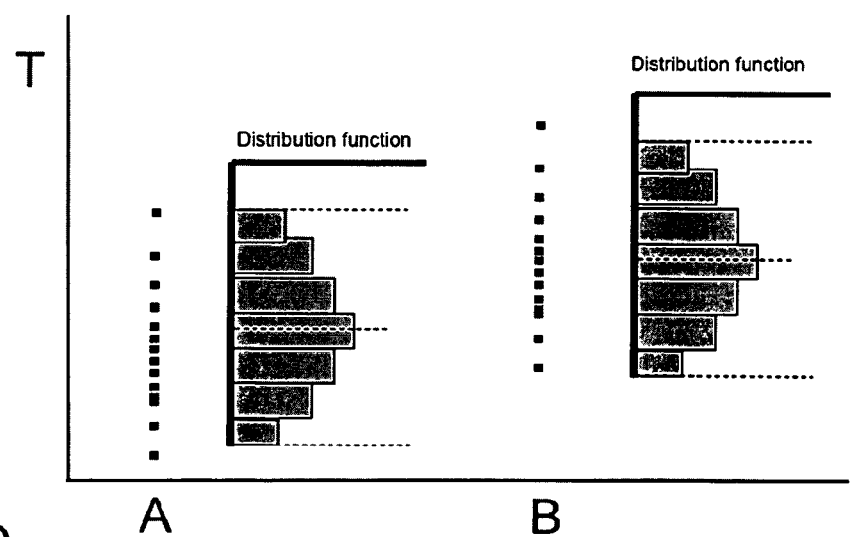
FIG. 1D graphically illustrates the relationship between the wafer position and thickness for the dies on the wafer according to one embodiment of the invention.

FIG. 1D graphically illustrates the relationship between the wafer position and thickness for the dies on the wafer for one embodiment of the invention. If measurements T were taken at die positions point A and point B the measurements would form a distribution. One embodiment includes one or more of the following measurements at points A and B: multiple die, wafer-to-wafer, lot-to-lot, and fab-to-fab. The distributions can be graphically viewed as a histogram and various statistical metrics can be computed such as mean T, maximum T, minimum T, variance T, range of T, or standard deviation of T. One embodiment includes conditional distributions as a function of die location, lot number or fab. One embodiment uses knowledge of the distribution of die at various radial locations to estimate a full wafer level variation distribution. One embodiment uses one or more of the distributions to estimate functional or parametric yield.

In some cases, a large number of measurements may not be economically feasible and models may be created from a subset of the measurements described above. In this embodiment, the models may be purely empirical or may be mathematical representations of physical or chemical processes. In either case, the data may be used to calibrate or modify the model to better estimate geometric features such as variable T. One embodiment uses a combination of measured data and model based computation to create the distributions described in FIG. 1D for a given die level pattern or chip design.

Therefore, by knowing where a point lies on the radius of a wafer, one may predict the thickness and the required design changes of the chip to best impact yield. In another embodiment the radial nature of plasma etching is used to predict features such as sidewall angle and trench depth which also have local and global/radial pattern dependences. In another embodiment, this information can be used for physical timing analysis. In a further embodiment, points on different wafers are recorded and related.

Figure 2A:
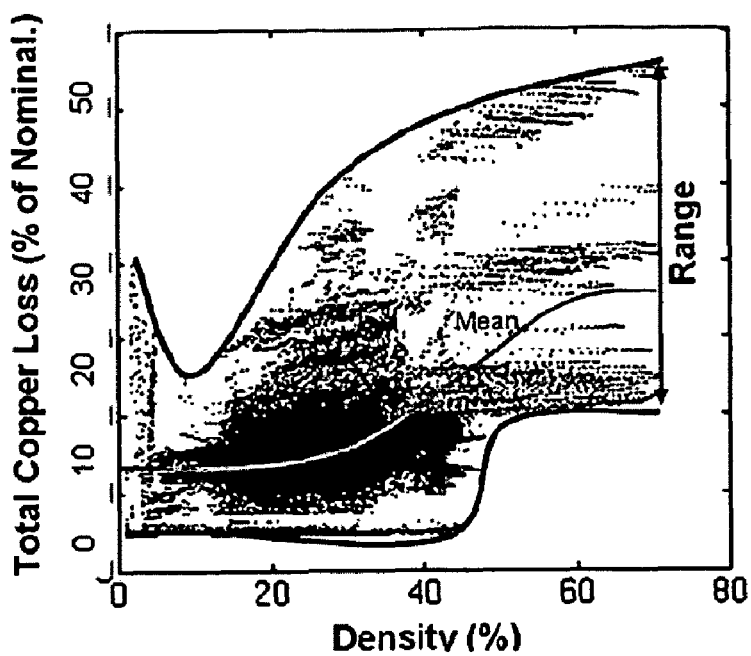
FIG. 2A graphically illustrates a relationship between copper loss and copper density for a given chip layout according to an embodiment of the invention.

Distributions of physical (e.g. thickness) or electrical (e.g. delay) parameters as a function of geometric features (e.g. wire width, density) can be plotted. The data can be assembled as a function of one or more models, such as Fab A or Fab B or die position. FIG. 2A graphically illustrates a relationship between copper loss and copper density for a given chip layout.

Figure 2B:
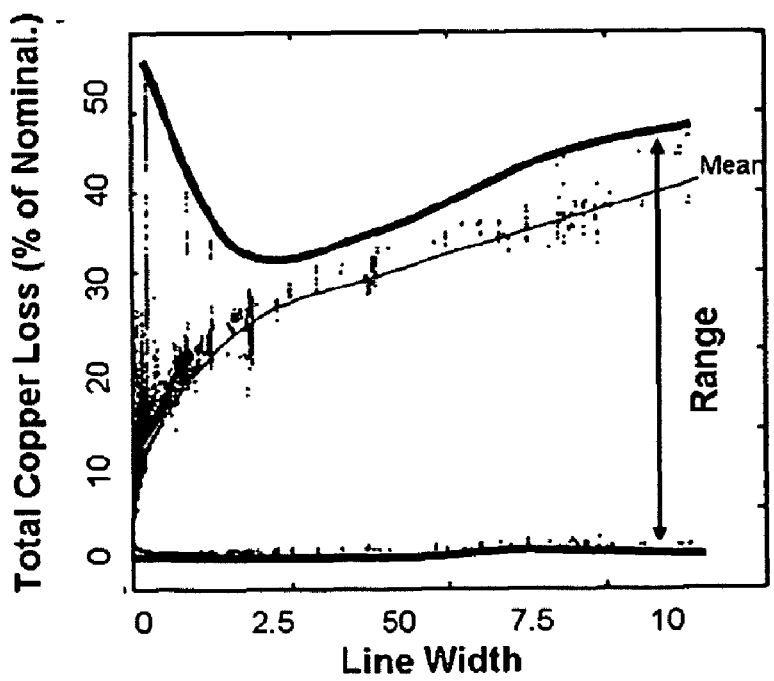
FIG. 2B graphically illustrates a relationship between feature width and thickness according to an embodiment of the invention.

FIG. 2B graphically illustrates a relationship between feature width and thickness. In one embodiment, a histogram of model produced variability parameters (e.g. thickness, width)

are taken with respect to geometric properties (e.g. density or width of the net). The distribution of a given feature with respect to a particular geometry may be used to manually or automatically examine and modify a layout. In another embodiment, statistics from the scatterplots such as range and mean are used to examine sensitivity of variables to a given geometry. Algorithms could be used to determine the minimum variance or range for a given parameter, such as thickness or width, as a function of a set of geometric design feature choices. These parameters may also be changed by the designer to improve the output yield, functional or parametric.

Figure 3A:
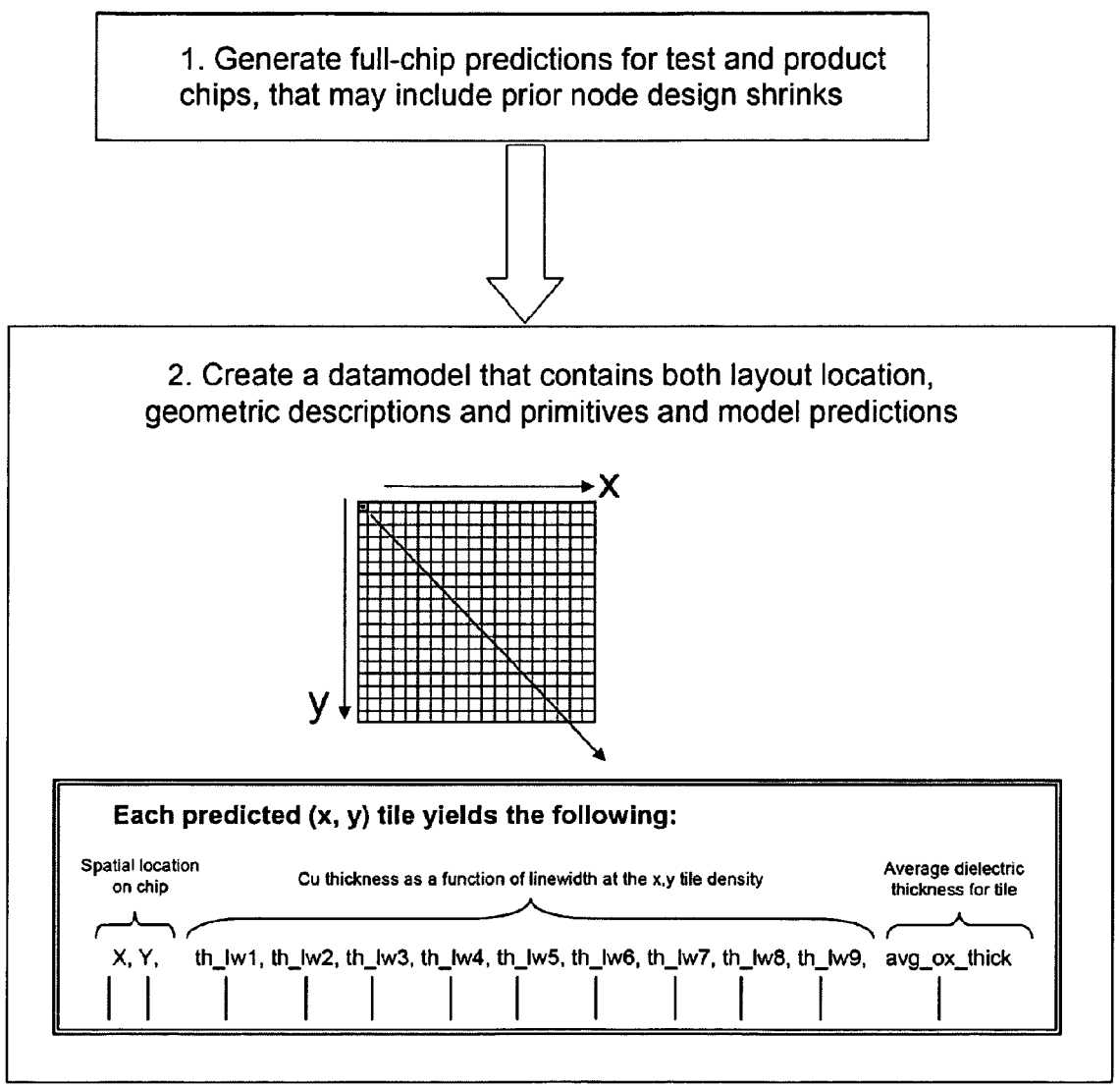
FIGS. 3A-D show example approaches for computing parametric sensitivity using models according to some embodiments of the invention.
Figure 3B:
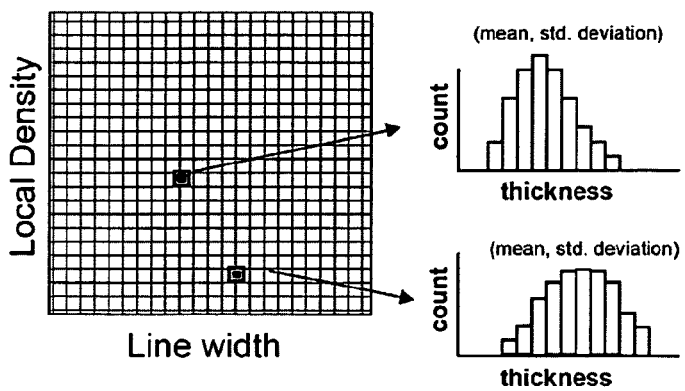
Figure 3C:
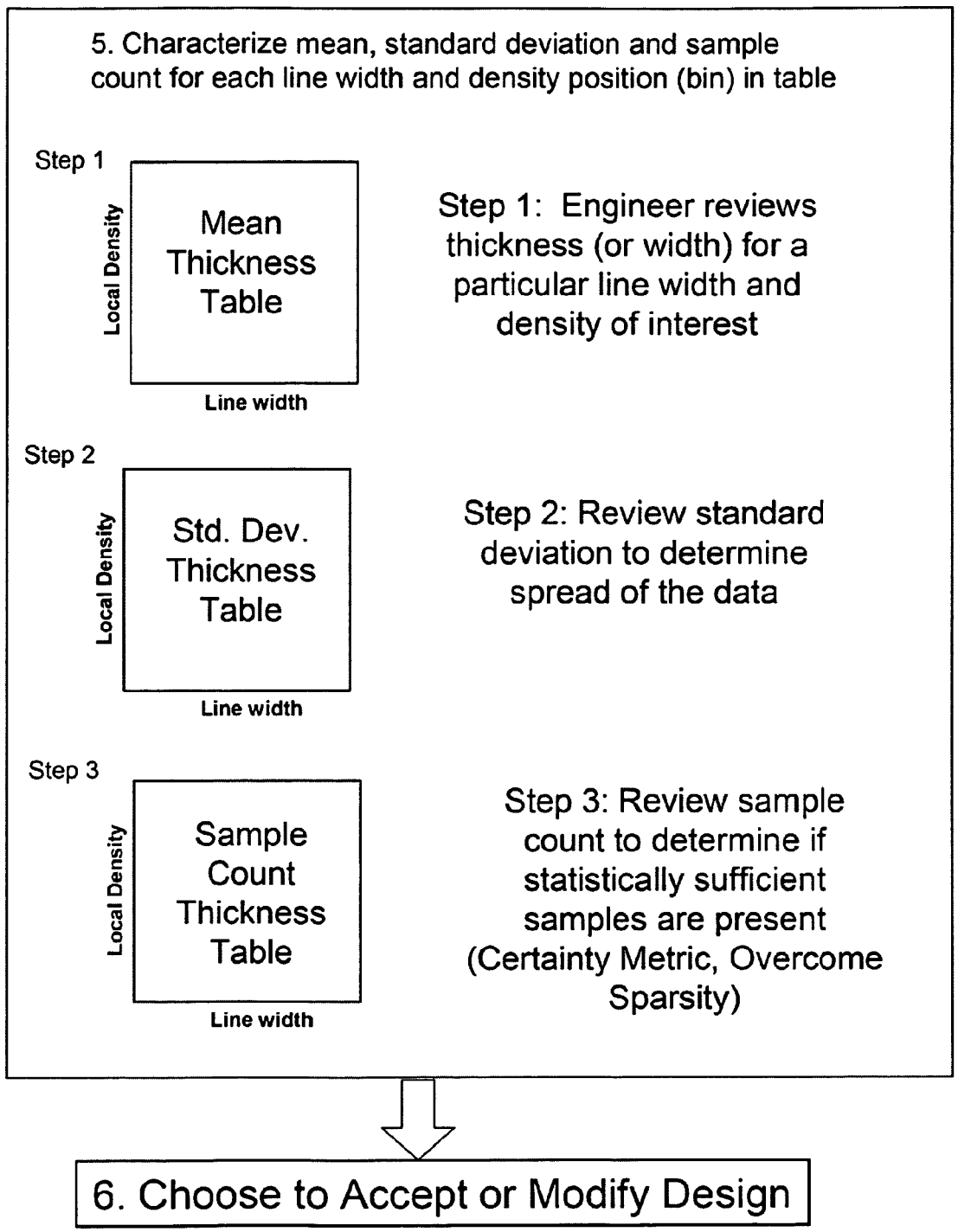
Figure 3D:
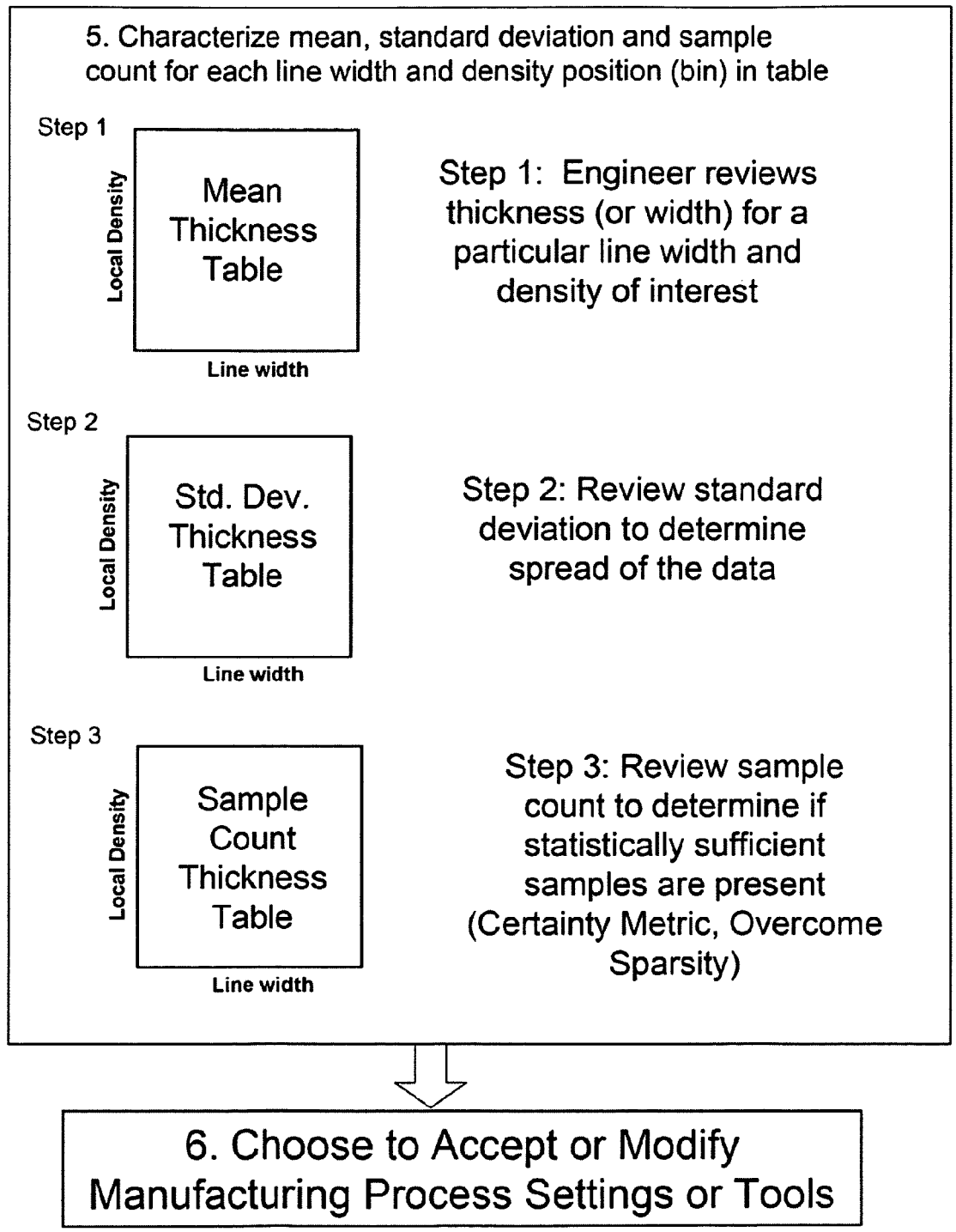

FIGS. 3A-D show example approaches for computing parametric sensitivity using models. In FIG. 3A, one or more models are used to generate post-manufacture feature predictions for one or more layout levels of one or more designs in (1). In (2), a datamodel is created to relate the spatial location, geometric features of the layout and model predicted geometric variability due to manufacturing. The datamodel is stored in a database. In FIG. 3B, the model predicted parameters of interest, such as thickness, are assembled with regard to specific layout geometries. Bins may be formulated so that the data can be grouped into histograms and the regularity of features such as fixed linewidth values may be used. Statistical metrics are applied such that the relationship between the mean, standard deviation, sample count or range of thickness data for a given linewidth and density can be examined. The examination of these relationships may be presented visually or represented numerically. The sample count tracking may be helpful to ensure that a sufficient number of samples are present to ensure statistically relevant analysis. In one embodiment, this relationship may be tracked and used to recommend additional data to be acquired. In FIG. 3C, a design engineer reviews the statistical relationships as a function of particular geometric features to provide guidance in design decisions or modifications. In FIG. 3D, a manufacturing engineer reviews the statistical relationships as a function of particular geometric features to provide guidance in manufacturing decisions or modifications relevant to the process or tool recipes and settings.

Figure 4:
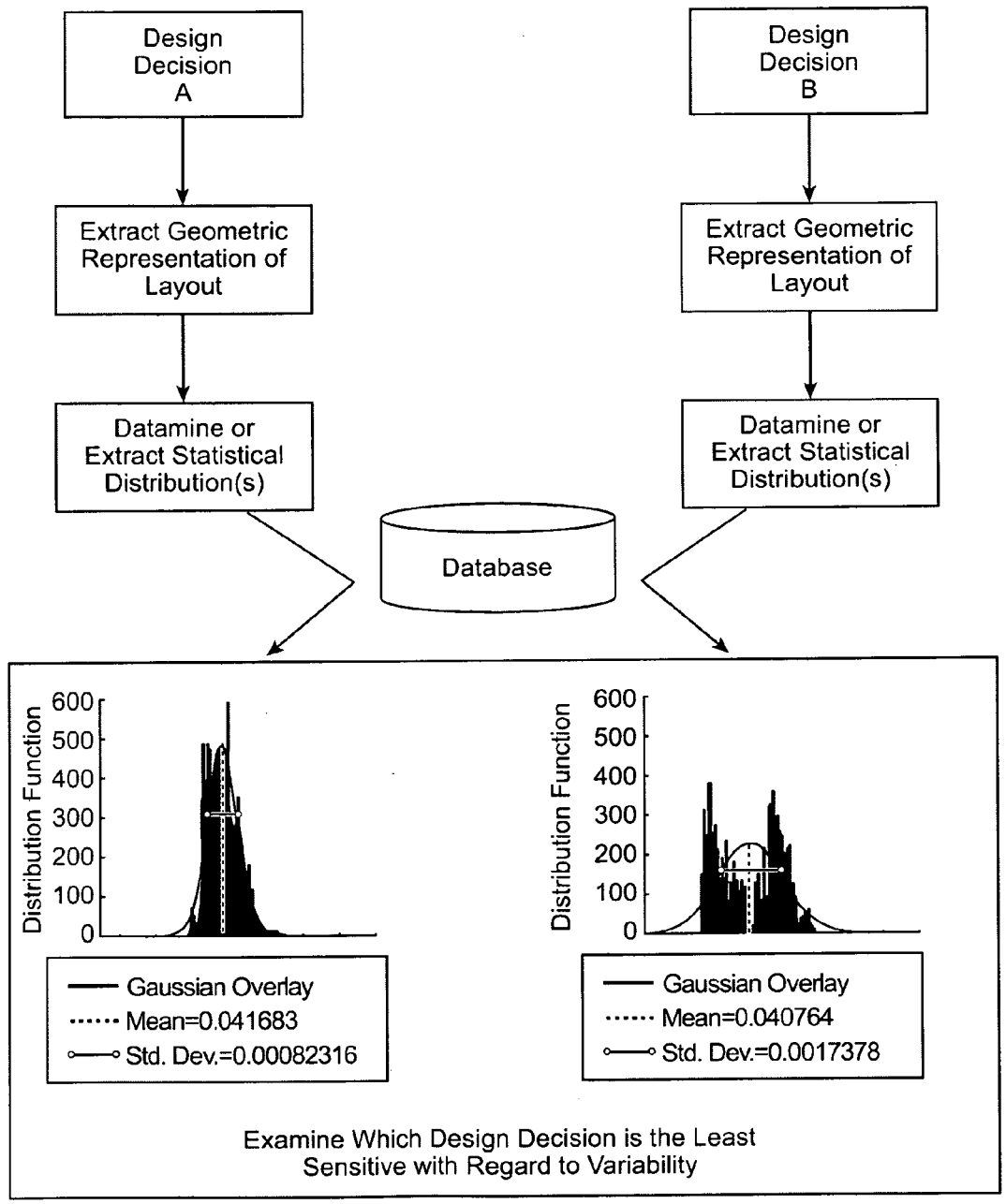
FIG. 4 shows another approach for design decision A and B according to an embodiment of the invention.

In one embodiment it may be helpful to know whether one design choice is more robust to variation than another design choice. In some cases where the number of potential variables that may affect a given design choice is considerable; a database that contains statistically relevant data may be employed. This example is illustrated in FIG. 4 where the layout representation for design decision A and B are shown. In practice the difference might be the result of two different wire widths, wire spacings, dummy fill methods, cell variants, routing decisions such as with and without a jog. The difference might also be one cell, block or larger design section that meets a more conservative ruledeck and one that meets a more relaxed ruledeck.

Certain geometric descriptions of the layouts are computed or extracted to create an appropriate representation. This geometric representation is used to extract relevant data from a database of pre-computed data. For example, for a given route design, decision A may be a wire width of X1 and spacing of X2 and design decision B may be a wire width of Z1 and spacing of Z2. The database contains manufacturing variability data for wire width and spacing values assembled from one or more designs. The database may also include values for one or more die locations, one or more fabs, one or more wafer lots or a sampling of random fab data.

Datamining or statistical methods may be used to assemble the proper distributions, such as employing mean centering, normalization, convolution of distributions, or the formation of compound and conditional probability functions. The raw distributions may be provided or summarized with using statistical metrics such as mean, variance, standard deviation, or range. The relevant statistical data for the two design decisions are used for analysis and comparison. While models may be useful when a high level of accuracy is required for a given design and a particular process, the computational time required may be high. One embodiment uses datamining methods to provide fast statistically relevant analysis and potentially combine this analysis with manufacturability rules.

In one embodiment, the data is used to determine the relative sensitivity of decision A versus B to variability such as line thickness variation due to CMP, line or gate width variation due to etch or lithography, thickness variation from CMP as a result of one fab, thickness variation from CMP as a result of multiple fabs, thickness variation for center and edge die for two different fab's CMP process flows. The relative sensitivity may be examined and used to choose a more robust design. The computational flow illustrated in FIG. 4 may be used iteratively to examine multiple design decisions determine design, such as routing or library characterization.

Figure 5:
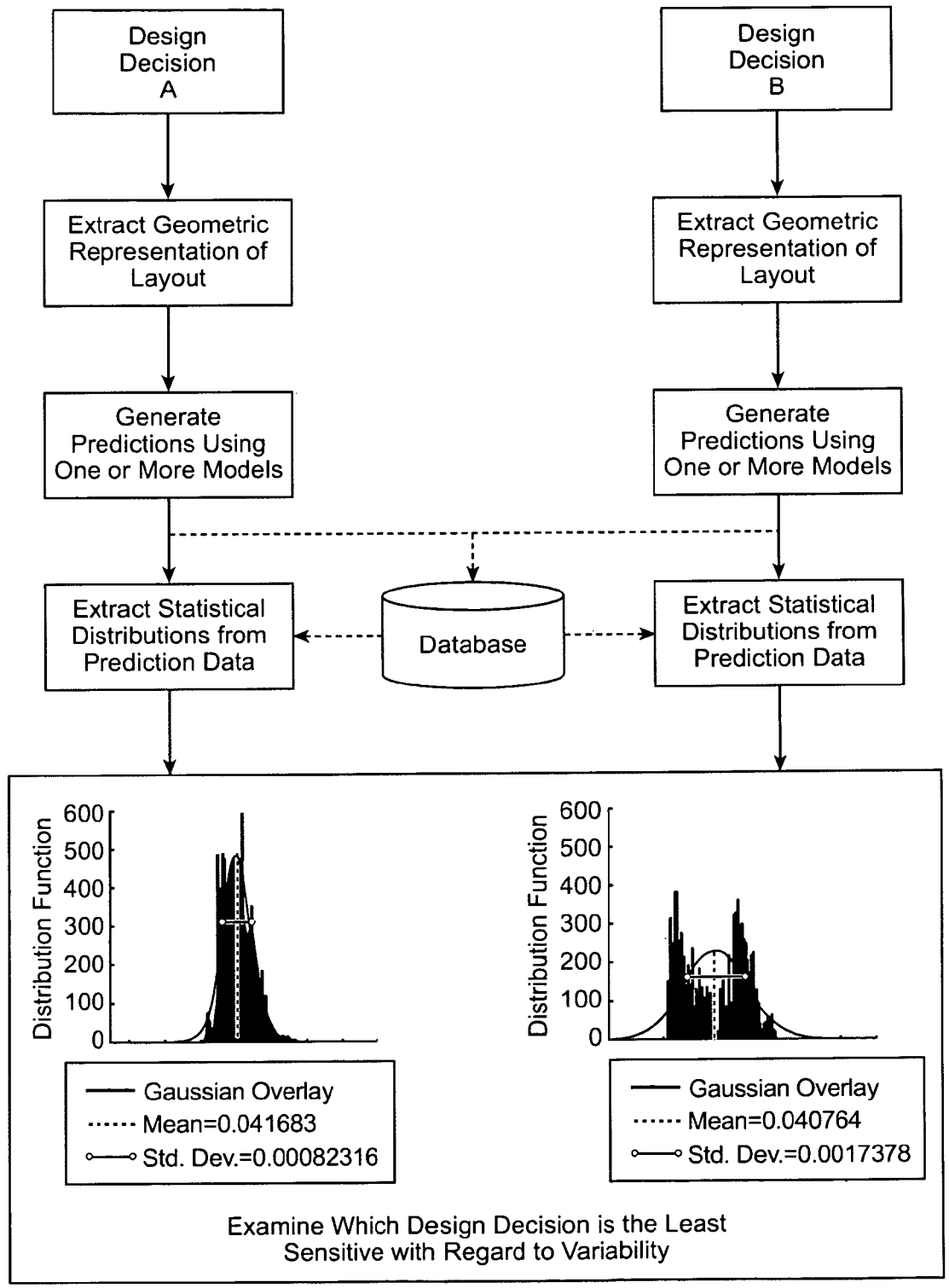
FIG. 5 shows the evaluation of two design decisions A and B according to an embodiment of the invention.

Another embodiment is illustrated in FIG. 5 where two design decisions A and B are evaluated. In this embodiment, one or more models are used to generate predictions of variability as a function of design decisions A and B. The model predicted data can be combined with relevant data from a database or used independently to create distributions of data for analysis. Datamining or statistical methods may be used to assemble the proper distributions, such as employing mean centering, normalization, convolution of distributions, or the formation of compound and conditional probability functions. The raw distributions may be provided or summarized with using statistical metrics such as mean, variance, standard deviation, or range. The relevant statistical data for the two design decisions are used for analysis and comparison. In one embodiment, the data is used to determine the relative sensitivity of decision A versus B to variability such as line thickness variation due to CMP, line or gate width variation due to etch or lithography, thickness variation from CMP as a result of one fab, thickness variation from CMP as a result of multiple fabs, thickness variation for center and edge die for two different fab's CMP process flows. The relative sensitivity may be examined and used to choose a more robust design. The computational flow illustrated in FIG. 5 may be used iteratively to examine multiple design decisions determine design, such as routing or library characterization.

In the embodiment shown in FIG. 6, a newly designed cell, block or full design is examined using one or more models that may include a fill range of manufacturing variability such as within-chip pattern dependences, die to die wafer level variability, wafer to wafer variability and/or random variability. These models may include thickness variability due to etch or CMP processing, width variability due to etch or lithography processing, threshold voltage variability due to ion implantation, lithography, deposition or STI CMP variability. The physical feature variability may be transformed into electrical variability using RC extraction and timing analysis. The relevant data may need to be assembled by combining the distribution so that a variability metric like thickness as a function of a given linewidth and density for within chip, die to die and random variation can be generated. In some cases, conditional probabilities may be computed given multiple distributions. Another embodiment may utilize previous computed data stored in a database where similar geometric features are mined from the database to complement or replace the explicit model generated predictions in the shown block. In general the models will provide a more exact simulation tailored to the specific design but in practice the computation trough many models may be computationally expensive.

In the embodiment shown in FIG. 7A, the cell, block or full design may be modified and used to generate the model predictions as a function of the original versus the modified design. The resulting variability information is used to determine the sensitivity of the design modification to the manufacturing variability. The modification could be as simple as perturbations of one or more wire widths, edges and spacings, dummy fill densities, spatial placement, length or width (shape) of lines, wire jogs, contacts, vias, gate, etc. The perturbations could be determined by prior model predictions or pre-determined by a rule or table. The models are used independently or in conjunction with a database of relevant information to compute the distribution of model prediction variation with regard to the design modifications. An example could be two different as-drawn wire width and spacing alternatives and the models are used to generate the manufacturing produced width and thickness variability for the within-chip, wafer level and lot to lot variation for two foundry process flows. The conditional distributions of width and thickness variability are generated for each width and spacing design alternative and the conditioning could include one particular fab A or for all fabs. This may be of particular use when a design may be manufactured at multiple fabs. The range, mean and standard deviation are used to determine the likely range of values as well as the overall robustness or sensitivity of the width and thickness.

Figure 7B:
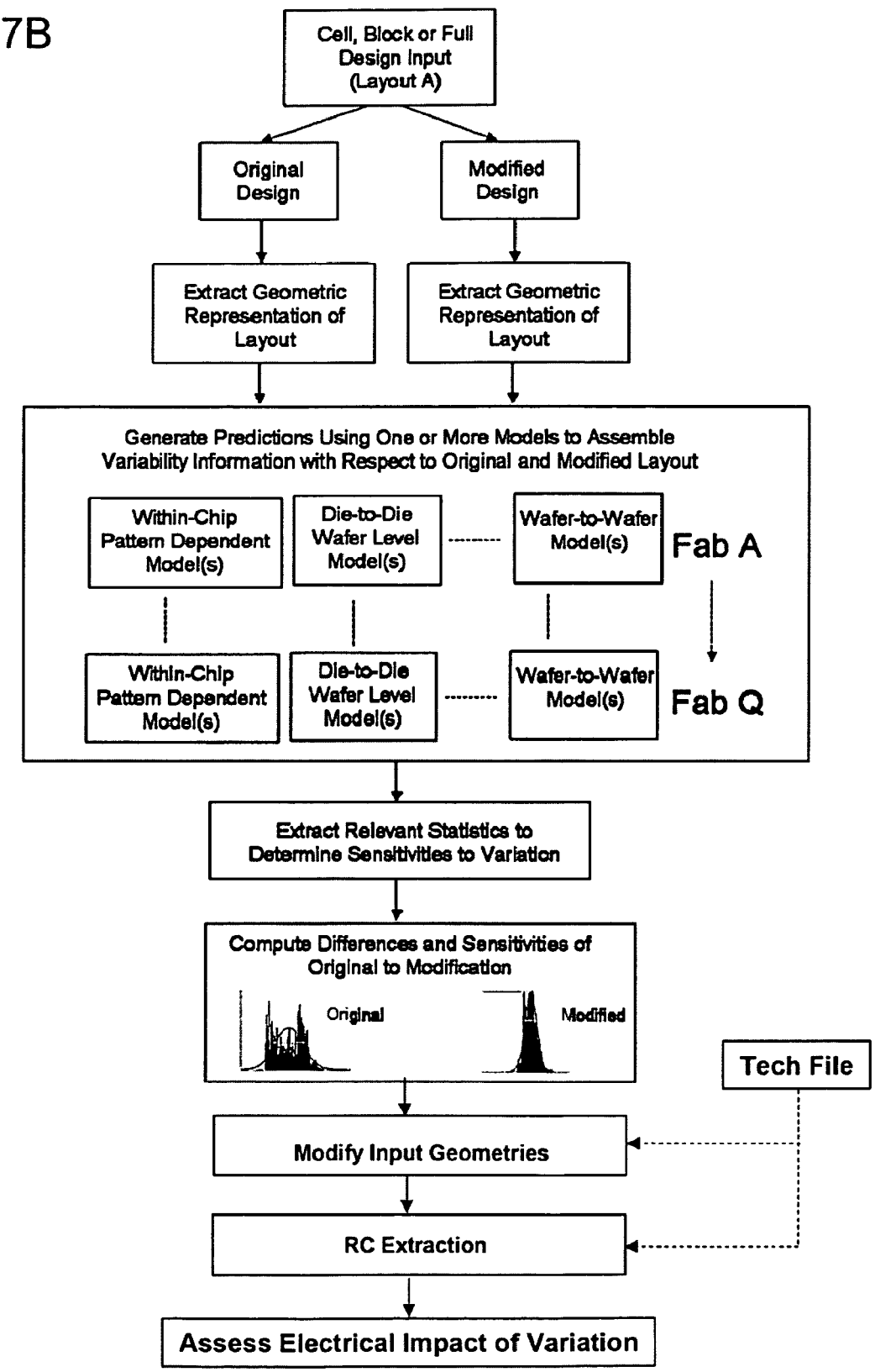

The embodiment illustrated in FIG. 7B uses this approach to determine the robustness with regard to electrical performance. The flow is similar to that shown in FIG. 7A however the physical distributions are used to directly modify geometries in the extraction tool technology file or are provided separately and the related geometries are modified within the extraction tool. The extraction tool could be used to provide the resistance and capacitance values for the distribution of physical geometry variation. One example is the use of corner cases where for a physical parameter like predicted line width variation, the maximum, minimum and mean values from the distribution are used to produce three different resistance and capacitance extractions. Another example may use mean and three sigma bounds. Another example may use the extraction tool to produce a sensitivity formula or table based on the incoming distribution and the resulting formulation used to estimate the resulting capacitance or resistance distribution. The RC extraction tool and the distribution may provide the sensitivity of resistance and capacitance values to manufacturing variability. One embodiment may input this information into a timing tool to assess the impact of thickness or width variation on delay. Another embodiment may input this information into a statistical timing tool. Another embodiment may input a predicted distribution of threshold voltage into electrical models to simulate transistor performance or estimate yield.

Figure 8A:
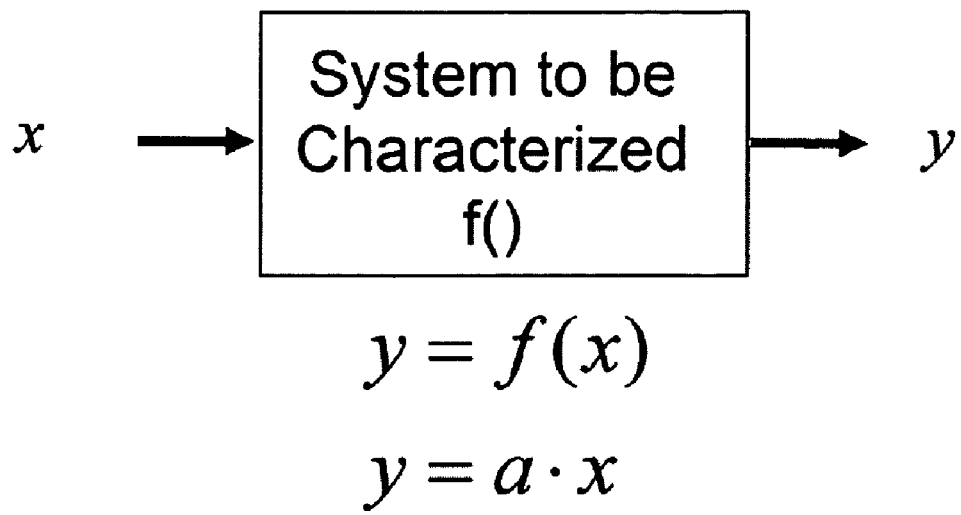
FIGS. 8A-B illustrate one approach to determine sensitivity according to some embodiments of the invention.
Figure 8B:
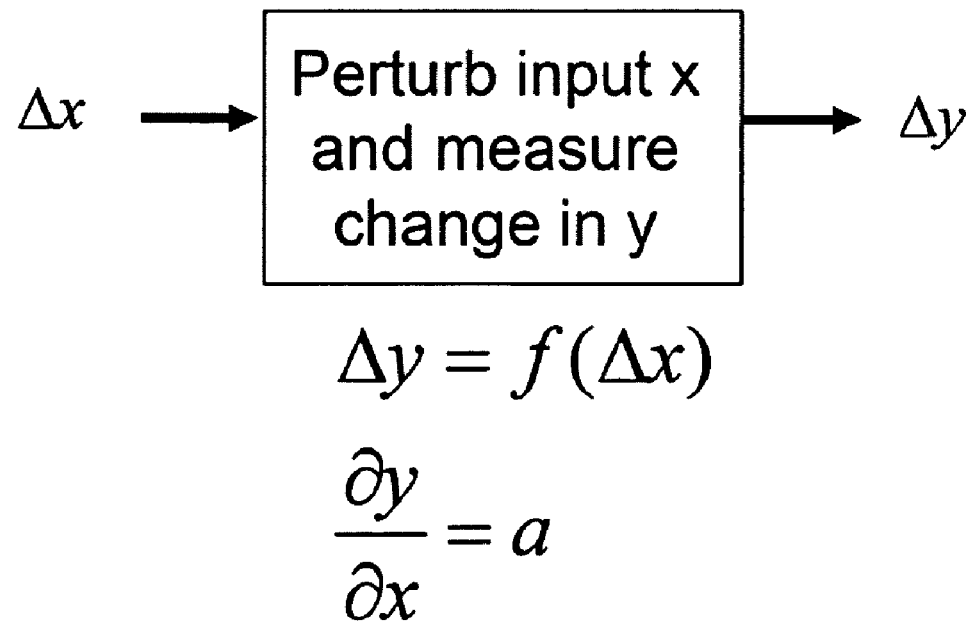

FIGS. 8A and 8B illustrate one approach to consider the term "sensitivity" according to some embodiments of the invention. A simple way to express a system is shown in FIG. 8A where there is an input value or vector x and the system transforms, using a description f( ), an input x into an output value or vector y. An example may be a geometrical description of the as drawn interconnect features for one or more levels as an input vector into a CMP model that predicts the resulting manufactured topography of those features. Another example may be a geometrical description of the as drawn interconnect features for one or more levels as an input vector into a lithography or etch model that predicts the manufactured feature widths. For a simple linear system, this could be a scalar multiplier a that transforms x to y.

In many cases, the value of x may not be completely deterministic and may vary with a known distribution. To better understand the potential values of y given the distribution of x, a sampling of x values may be input into the system to review the impact on output y. For a linear system, this could be a simple change in x, $\Delta x$, transformed by the scalar a into the change in y, $\Delta y$. If the value of a is unknown, the sensitivity of y with respect to x can be calculated by computing the partial derivative of y with respect to x. This example can be extended to multi-variate systems and the sensitivity matrix computed as the Jacobian of the given system and input vector $\bar{x}$ and output vector $\bar{y}$. For a nonlinear function or system f( ), the method would produce a local linearization of the relationship between x and y and may be useful for local analysis or optimization. For a more global area, several linearization points across the area may be required to provide an adequate linearization.

Figure 9:
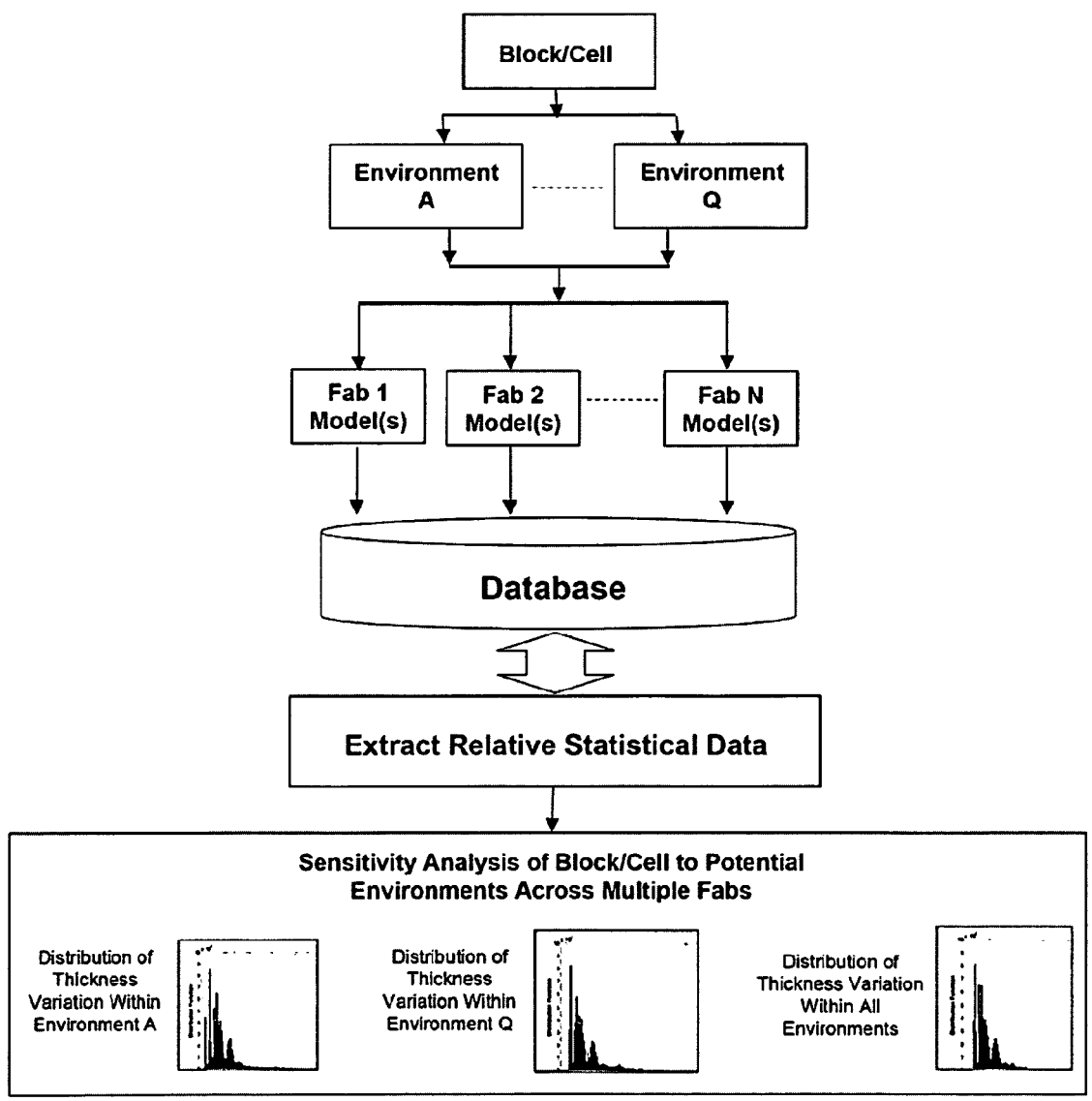
FIG. 9 shows an approach for simulating the distribution of manufacturability variation according to an embodiment of the invention.

Another embodiment is shown in FIG. 9. In this approach, a block or cell is placed into one or more contexts to simulate the distribution of manufacturability variation that may result from different environments, e.g., as described in U.S. patent application Ser. No. 11/768,851, filed on Jun. 26, 2007, which is hereby incorporated by reference in its entirety. For example, an IP block could be placed into different contexts to simulate the types of thickness variation that may impact the IP block in production. In some cases, a given chip design may be manufactured at multiple foundry sources and the manufacturing variation may be characterized separately for each fab. In this approach, there would be multiple (N×Q) distributions for the Q environments and N fab models. The data could be stored in a database where the relevant statistical data could be extracted to examine manufacturing sensitivity of physical or electrical parameters with regard to the variation in Q environments and the variation across N fabs. The illustrated example in FIG. 9, shows the distribution of thickness variation for environment 1 across the N fabs, the distribution of thickness for environment Q for a subset of fabs and the distribution of thickness variation within all environments and all fabs. In one embodiment the combination or sum of distributions that represent independent random variables, across fabs for example, is done by convolving the individual probability density or probability mass functions. According to another embodiment, an additional transformation is performed from physical variation to electrical variation using parasitic (RC) extraction and timing (e.g. statistical timing tool) software that can accommodate distributions of physical variation such as thickness and width.

Figure 10A:
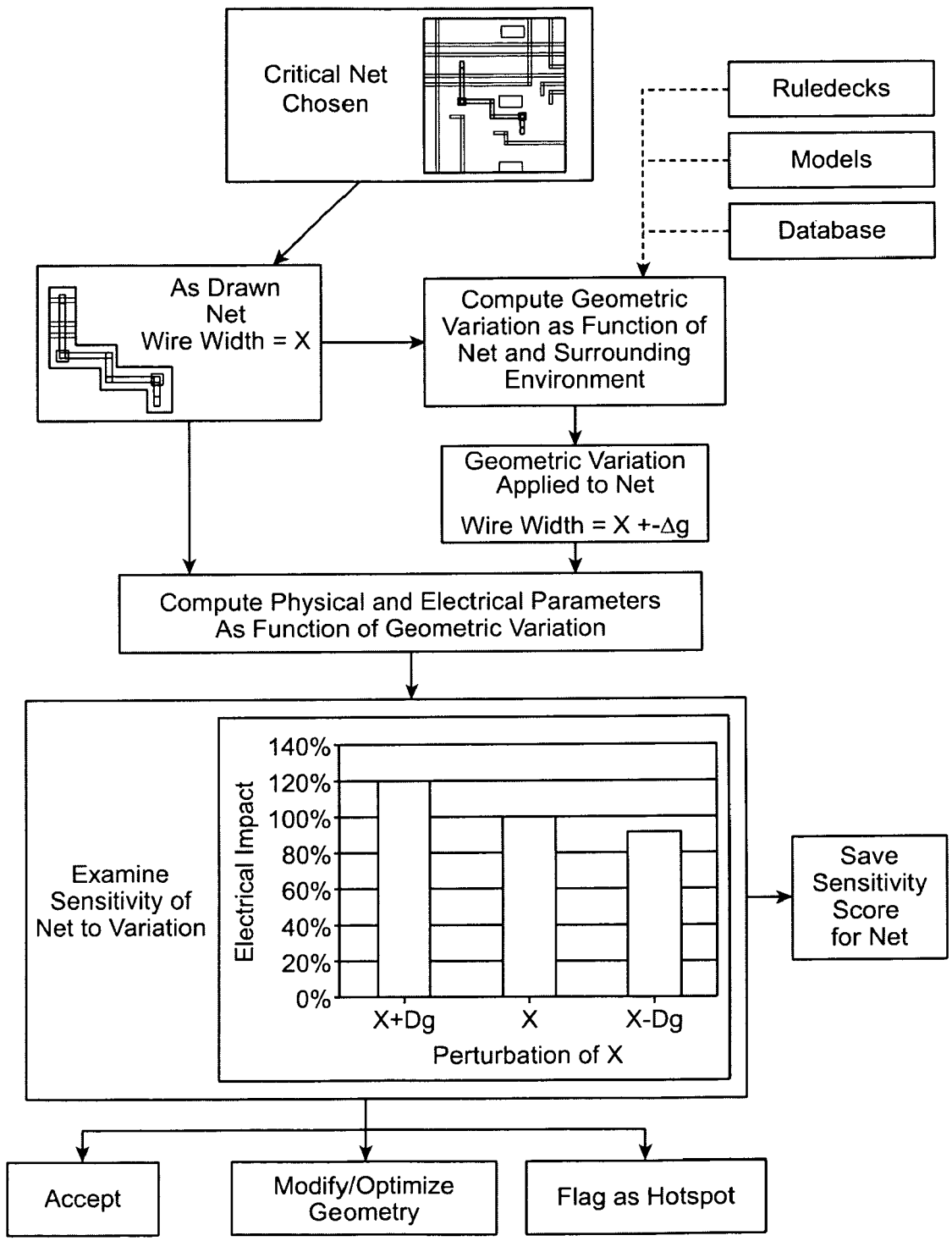
FIG. 10A illustrates a use case example according to an embodiment of the invention.
Figure 10B:
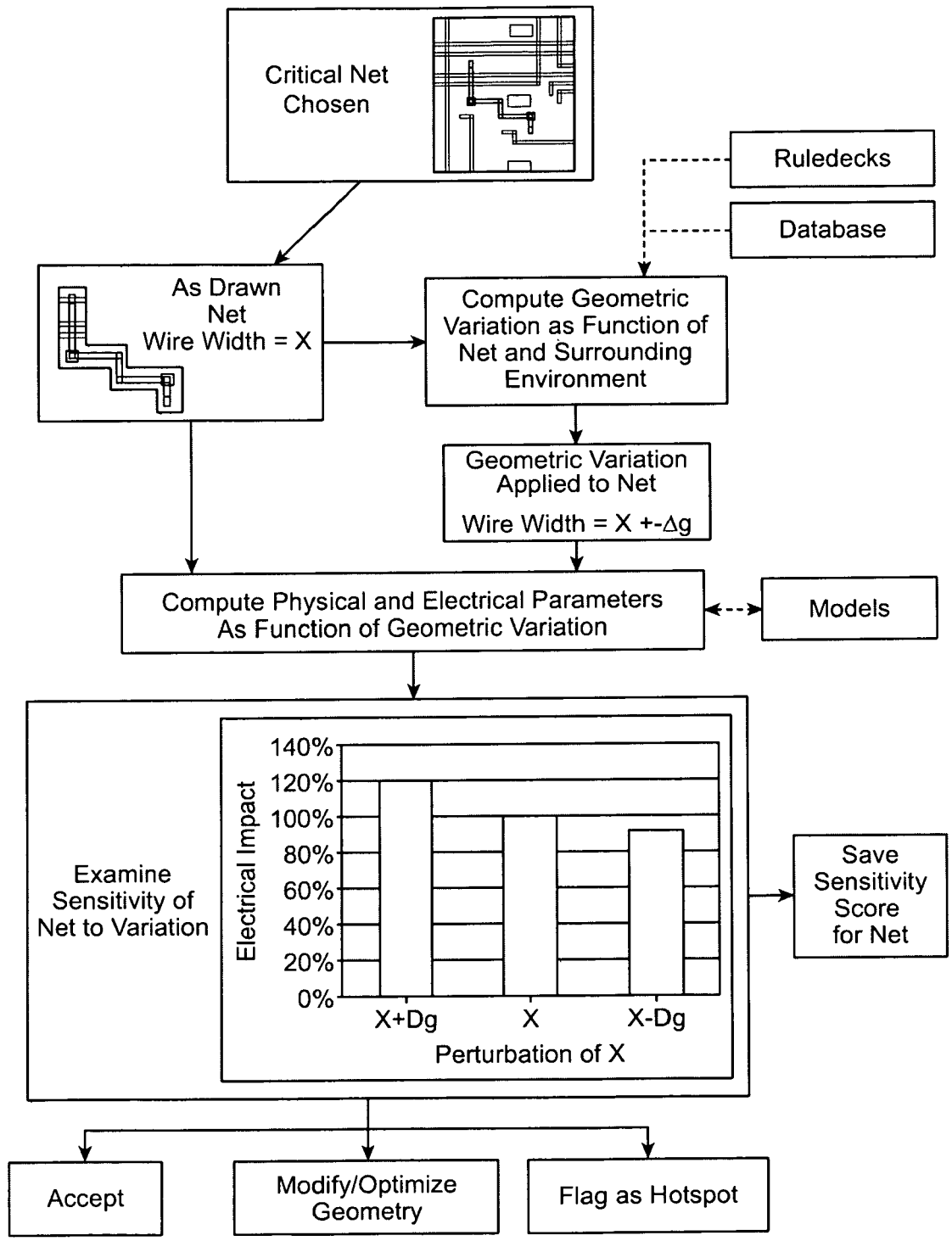
FIG. 10B illustrates using additional models to compute the resulting two or three dimensional variation in the manufactured features according to an embodiment of the invention.

In FIG. 10A, a use case example is provided. A critical net is chosen manually by a designer or automatically by a design tool. The as-drawn or layout specified feature is described deterministically with regard to geometry, e.g., it has a fixed thickness, width, or length. The geometric variation may be provided by manufacturing rule decks, model predictions or from an existing database of manufacturability data. The variation may be specified for the features within the particular net of interest or may also include variation on the surrounding environment. For example, models are used to determine the 3 sigma values for width variation for this specific critical net and design and this value is assigned to $\Delta g$. In some cases, the as-drawn and $\Delta g$ values will form a set of geometric parameters. In other cases, this could be a distribution, which is sampled, e.g. Monte Carlo, to form a set of geometric parameters. Parasitic extraction and circuit simulation tools may also be employed to transform the physical variation to electrical variation. The sensitivity of the net to variation is examined. In one embodiment, the current specified critical net is determined to be robust to the variation and is accepted, or is determined to be problematic and is automatically modified to meet robustness criteria or is determined to be problematic and flagged as a hotspot for subsequent analysis or repair. One embodiment may use small perturbations of the features in the layout to identify only those features that exhibit sensitivities beyond an acceptable threshold and use this information to introduce future perturbations given past data relative to the layout feature geometry or the manufacturing environment or fab. Another embodiment uses the sensitivity information to create or modify design rules. In FIG. 10B, additional models may be used to compute the resulting two or three dimensional variation in the manufactured features. An example of this could be known variation in thickness that is applied as Δg and physical lithography and etch models used to determine the subsequent variation in manufactured width. In this embodiment, the sensitivity of electrical parameters such as delay with respect to width could be displayed as a histogram. As shown the as-drawn geometry can be considered the nominal value, which results in a 100% of the nominally expected delay. In the histogram shown, the Δg values result in a 20% increase and 10% decrease in expected delay, the transformation of the physical variation to electrical variation.

In general, layout parameters are described using deterministic values; however, in reality the manufactured features are variables with a particular distribution. The variability may exist in physical parameters such as gate length, wire width, wire thickness, dielectric thickness, contact and via width and thickness, ion implant and diffusion profiles, shallow trench isolation induced variation to the gate. The physical parameter variation may impact electrical parameters such as threshold voltage shifts due to manufactured gate features or ion implant variability or delays resulting from physical conductor shape variation impact on the resistance and capacitance of individual nets. In this context, the actual features of the integrated circuit that the layout represents are stochastic in nature. In another embodiment, the layout database not only stores a description of the intended geometries but also a description of the stochastic characteristics of the geometries. In another embodiment, rule checking decks are performed on the statistical metrics associated with the stochastic description, solely or in conjunction with the as-drawn geometries. In another embodiment, the stochastic description is used in conjunction with pre-determined guardbands which are normally human defined limits encoded within rules. In another embodiment, the probabilistic descriptions are used to predict the probability of the geometric features of a given layout, which may be used to replace the deterministic geometric value. In another embodiment, where the number of potential factors result in a scaling problem with the huge volume of potential distributions for a wide spectrum of patterns and features, a fixed set of allowable patterns or features may be created in sufficient number that allow for probabilistic descriptions to be used. In another embodiment, the probabilistic description is used to determine the relative variability of geometric features and the mean values are allowed to float or be matched to a particular fab measurement or drift specification. For example, the variation could be expressed as a function of nominal width or thickness value, which may drift over time. In another embodiment the relative probabilistic description or distribution is used with applications where the relative variation related to matching geometric features or a set of features that constitute a cell are important.

Another embodiment of the shown flows in FIGS. 10A and 10B addresses the need to generate meaningful distributions for any physical parameter and assess the sensitivity of the parameter. The design could be modified to reduce the sensitivity or improve the robustness of the design. This could be done automatically by looping through FIG. 10 and modifying the features to reduce the partial derivative $$\frac{\partial J}{\partial x}$$

of the metric of interest J with respect to the design parameter x being modified. The cost function in this iteration is to find a parameter x that meets the existing design rule criteria and has a small value $$\frac{\partial J}{\partial x}$$

that reflects robustness to variability.

Figure 11:
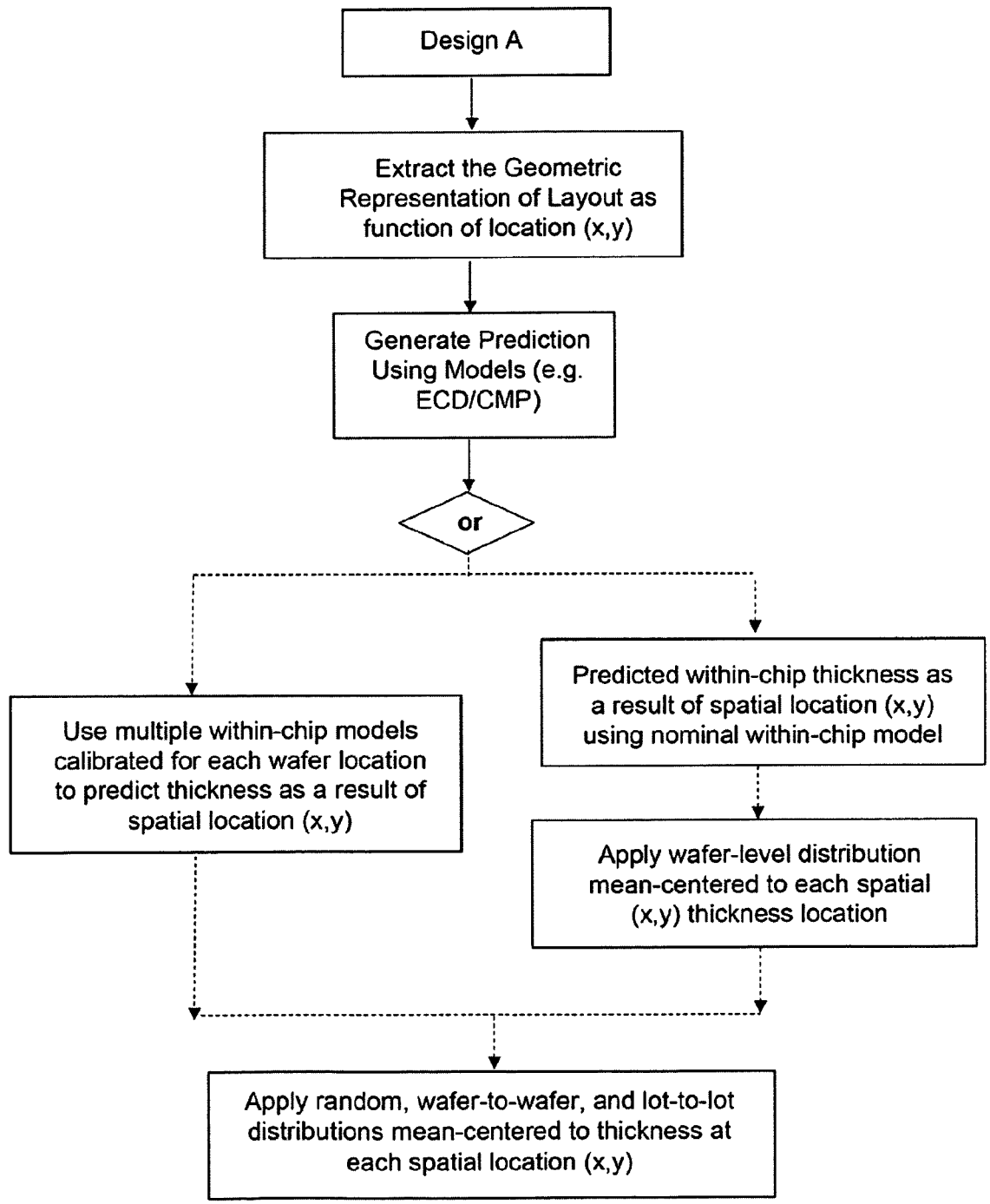
FIG. 11 shows an approach to combine deterministic predictions for a given spatial location across a chip and then use manufacturing variation distributions that are spatially invariant or approximated to be spatially invariant according to an embodiment of the invention.

Another embodiment shown in FIG. 11 may combine deterministic predictions for a given spatial location (x,y) across a chip and then use manufacturing variation distributions that are spatially invariant or approximated to be spatially invariant. The distributions are mean-centered about the deterministic within-chip prediction, e.g. using electro-chemical deposition (ECD) or chemical mechanical polishing (CMP) models, at each spatial location. The manufacturing variation distributions may be measured as wafer-to-wafer, lot-to-lot or random variation that captures process variation over time. There is an option shown where models calibrated for multiple die locations are used to capture wafer level variation and as such, the distribution is mean centered to the spatial prediction for each die location model. The other option is where only one model is calibrated and a wafer-level variation distribution is applied. In this approach, whether the distribution is mean-centered or skewed toward the minimum or maximum part of the distribution depends upon which die the model is calibrated on.

Figure 12:
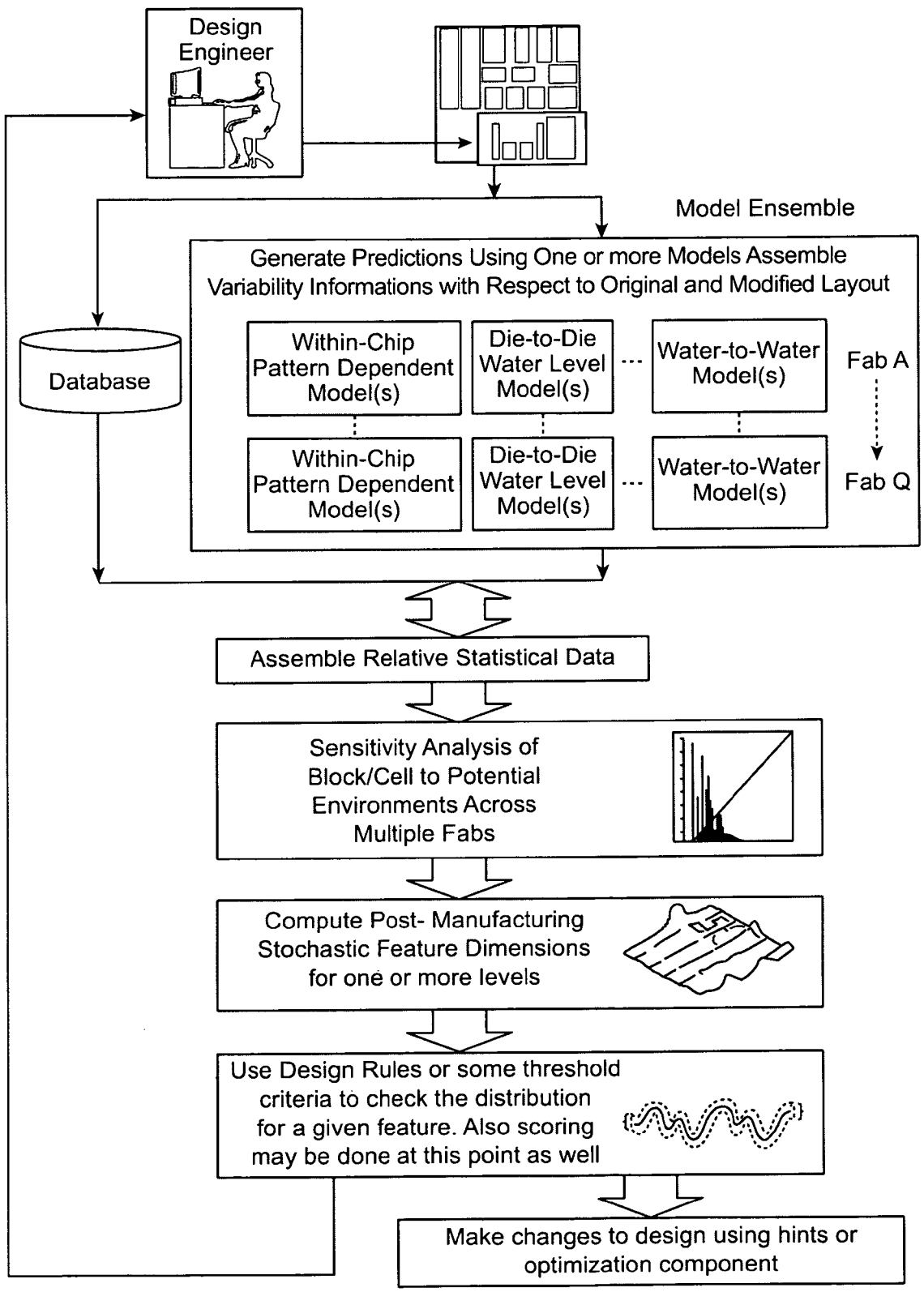
FIG. 12 shows a process flow according to one embodiment of the invention for performing statistical analysis within a design tool according to an embodiment of the invention.

FIG. 12 shows a process flow according to one embodiment of the invention for performing statistical analysis within a design tool. In this figure, the distributions for a particular section of the design are generated and applied against manufacturability rules to determine features that do not meet the rules. Once identified the features may be modified automatically within the design tool using hints or optimization components. An alternative approach alerts the designer of potential problems or where a fix cannot be automatically made. The process may perform measurements, e.g., thickness measurements, of the wafer. As stated above, the thickness variation is radial. In one embodiment, these measurements are performed on test wafers at the fab. In another embodiment, these measurements are provided to the designers by analyzing the produced wafers. Other ways to obtain these measurements are possible. Statistical analysis may be performed on the measured information to determine cross-wafer, cross-lot relationships. In one embodiment, the maximum and minimum thickness of the wafer for every point of the die is determined and related to other similar points on the other dies to fully understand the thickness relationship. In other embodiments, other measurements may be used.

The analyzed information is used to develop models to assist the designers to reduce the sensitivity of the design to the production process. In one embodiment, sensitivity to variation is reduced. In another embodiment, variations are viewed as a function of geometry. Other embodiments considered other tradeoffs by looking at the model predictions to make the designs less sensitive to process variations. In another embodiment, the manufacturing processes are modified as to reduce variation or improve robustness to the analyzed designs. In another embodiment, the database may be used by manufacturing engineers to analyze the impact of a given process decision on one or more designs.

The information and models are provided for data mining to produce a library to improve future design and processing. In one embodiment, the information of thickness and line width allows for different slices to be analyzed. In another embodiment, the information includes the last 20 designs. For example, line width X has Y distribution. One may slice the distribution as a function of thickness (X, Y). In a further embodiment, multiple dimensional analyses such as distributions for thickness (X, Y, and Z), (X, Y, not Z), etc. may be used. Furthermore, Design kits may be provided which include model information or statistical data or models specific to a particular type of design, for example microprocessors, low power or automotive devices.

Encryption and other security may be optionally added to the design library to ensure the safety and secrecy of the fabrication process and library information. In one embodiment, encrypted libraries are provided within the kits. In another embodiment, the calibration is based on test wafers. In a further embodiment, all the designers see are the thickness information.

Figure 13:
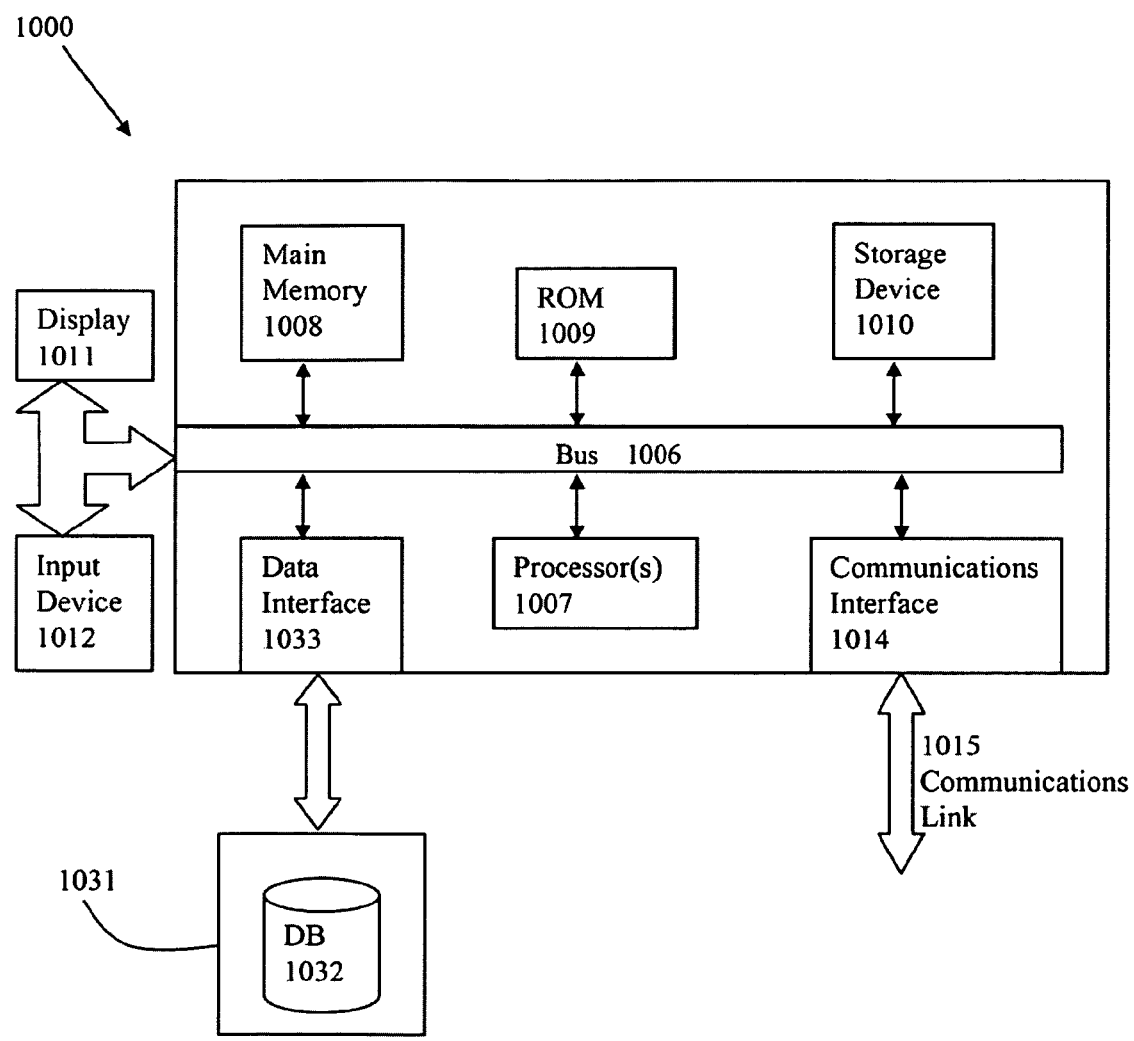
FIG. 13 depicts a computerized system on which a method for robust design can be implemented according to an embodiment of the invention.

The execution of the sequences of instructions required to practice the embodiments may be performed by a computer system 1000 as shown in FIG. 13. In an embodiment, execution of the sequences of instructions is performed by a single computer system 1000. According to other embodiments, two or more computer systems 1000 coupled by a communication link 1015 may perform the sequence of instructions in coordination with one another. Although a description of only one computer system 1000 will be presented below, however, it should be understood that any number of computer systems 1000 may be employed to practice the embodiments.

A computer system 1000 according to an embodiment will now be described with reference to FIG. 13, which is a block diagram of the functional components of a computer system 1000. As used herein, the term computer system 1000 is broadly used to describe any computing device that can store and independently run one or more programs.

Each computer system 1000 may include a communication interface 1014 coupled to the bus 1006. The communication interface 1014 provides two-way communication between computer systems 1000. The communication interface 1014 of a respective computer system 1000 transmits and receives electrical, electromagnetic or optical signals, which include data streams representing various types of signal information, e.g., instructions, messages and data. A communication link 1015 links one computer system 1000 with another computer system 1000. For example, the communication link 1015 may be a LAN, in which case the communication interface 1014 may be a LAN card, or the communication link 1015 may be a PSTN, in which case the communication interface 1014 may be an integrated services digital network (ISDN) card or a modem, or the communication link 1015 may be the Internet, in which case the communication interface 1014 may be a dial-up, cable or wireless modem.

A computer system 1000 may transmit and receive messages, data, and instructions, including program, i.e., application, code, through its respective communication link 1015 and communication interface 1014. Received program code may be executed by the respective processor(s) 1007 as it is received, and/or stored in the storage device 1010, or other associated non-volatile media, for later execution.

In an embodiment, the computer system 1000 operates in conjunction with a data storage system 1031, e.g., a data storage system 1031 that contain a database 1032 that is readily accessible by the computer system 1000. The computer system 1000 communicates with the data storage system 1031 through a data interface 1033. A data interface 1033, which is coupled to the bus 1006, transmits and receives electrical, electromagnetic or optical signals that include data streams representing various types of signal information, e.g., instructions, messages and data. In embodiments, the functions of the data interface 1033 may be performed by the communication interface 1014.

Computer system 1000 includes a bus 1006 or other communication mechanism for communicating instructions, messages and data, collectively, information, and one or more processors 1007 coupled with the bus 1006 for processing information. Computer system 1000 also includes a main memory 1008, such as a random access memory (RAM) or other dynamic storage device, coupled to the bus 1006 for storing dynamic data and instructions to be executed by the processor(s) 1007. The main memory 1008 also may be used for storing temporary data, i.e., variables, or other intermediate information during execution of instructions by the processor(s) 1007.

The computer system 1000 may further include a read only memory (ROM) 1009 or other static storage device coupled to the bus 1006 for storing static data and instructions for the processor(s) 1007. A storage device 1010, such as a magnetic disk or optical disk, may also be provided and coupled to the bus 1006 for storing data and instructions for the processor(s) 1007.

A computer system 1000 may be coupled via the bus 1006 to a display device 1011, such as, but not limited to, a cathode ray tube (CRT), for displaying information to a user. An input device 1012, e.g., alphanumeric and other keys, is coupled to the bus 1006 for communicating information and command selections to the processor(s) 1007.

According to one embodiment, an individual computer system 1000 performs specific operations by their respective processor(s) 1007 executing one or more sequences of one or more instructions contained in the main memory 1008. Such instructions may be read into the main memory 1008 from another computer-usable medium, such as the ROM 1009 or the storage device 1010. Execution of the sequences of instructions contained in the main memory 1008 causes the processor(s) 1007 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1007. Such a medium may take many forms, including, but not limited to, non-volatile and volatile media. Non-volatile media, i.e., media that can retain information in the absence of power, includes the ROM 1009, CD ROM, magnetic tape, and magnetic discs. Volatile media, i.e., media that can not retain information in the absence of power, includes the main memory 1008.

In the foregoing specification, the embodiments have been described with reference to specific elements thereof. It will, however be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

We claim:

1. A method for robust design, comprising:
identifying a plurality of models that characterize variations for integrated circuit feature dimensions, wherein the variations are due to interactions between at least a fabrication process and a designed pattern or feature on a section of at least one integrated circuit design;
combining, by using a processor, the variations characterized from the plurality of models to generate a conditional distribution, a range or a statistical measure of variation data in one or more geometric parameters of the design.

2. The method of claim 1, wherein the fabrication process utilizes one or more processing tools or flows from multiple fabrication facilities.

3. The method of claim 1, wherein the fabrication process utilizes the plurality of models, wherein the plurality of models comprise one or more of: chemical mechanical polishing, etch, lithography, deposition, implantation or electroplating processes.

4. The method of claim 1, wherein the variations comprises at least one of: variation within a single chip due to design pattern and fabrication process interaction, wafer level or die-to-die variation, wafer-to-wafer variation for a single tool or flow, tool or flow specific variation measurements, or fabrication facility specific variation measurements.

5. The method of claim 1 further comprising assessing the sensitivity of the design to the variations or a statistical characteristic of the variations using one of more distributions, wherein the variations comprise the range, maximum values, minimum values, standard deviation or mean.

6. The method of claim 5, further comprising:
characterizing multiple variants of the design;
comparing the sensitivities of the multiple variants of the design; and
determining a level of robustness or results to be used as part of a scoring process.

7. The method of claim 6 further comprising:
selecting one design variant of the multiple variants over another design variant of the multiple variants; and
suggesting modifications to the design based on the selection.

8. The method of claim 1, in which the variations include electrical impact, the electrical impact comprising the resistance, capacitance or inductance for the geometric parameters of the design.

9. The method of claim 1 further comprising one or more of the following:
assessing yield associated with the design that contains the section;
generating layout patterns for pattern based hotspot matching;
computing statistical timing values, resistance, capacitance or inductance for any part of the section;
creating, modifying, or examining corner cases for resistance, capacitance or inductance extraction;
evaluating or selecting third-party IP;
evaluating the sensitivity of the section to an environment;
modifying the layout patterns or fill contained in the section;
modifying the position of the section within a layout;
reducing the sensitivity of the section or any part of the layout patterns within the section to the environment,
evaluating the electrical impact of the environment on the section comprising analyzing timing, power and signal integrity; or
creating routing during any stage of the electronic design process, wherein the routing is created initially or as part of a post-route optimization of the design or to assess the section of design.

10. A method comprising:
identifying a plurality of models that characterize a variation in integrated circuit feature dimensions resulting from interactions between one or more fabrication processes and designed patterns or features on a section of one or more integrated circuit designs;
providing a context or environment with the section and the multiple models to simulate interactions between the section and the context or environment; and
combining, by using a processor, a plurality of data associated with the variation characterized from the plurality of models to generate a conditional distribution or a statistical measure of variation data in one or more geometric parameters, wherein the variation data comprises at least one of maximum, minimum, mean, range and standard deviation values.

11. The method of claim 10, wherein the section of the one or more designs comprises a cell, macro or block.

12. The method of claim 11, further comprising computing statistical information based on data mining and/or statistical methods.

13. The method of claim 11 further comprising:
simulating the impact of multiple variation sources; and
determining the robustness of the design, the section or block of the design, and/or set of design variants or modifications to the variation.

14. The method of claim 13 further comprising selecting one design, block design variant or modification over another design.

15. The method of claim 10, further comprising comparing or selecting one or more fabrication facilities or sources.

16. The method of claim 10, further comprising meeting the physical and/or electrical requirements for device or layout to be fabricated on a modeled flow.

17. The method of claim 10, further comprising characterizing geometric shapes or elements that compose a critical net and form a variation description of the net, wherein the variation description comprises at least one of statistical distribution, maximum and minimum geometric or shape parameter.

18. The method of claim 17, wherein the variation description comprises computed resistance, capacitance or inductance of one or more components of the net.

19. The method of claim 17, further comprising:
determining a violation of a design rule; and
identifying a hot spot.

20. An apparatus for robust design, comprising:
a processor to:
identify a plurality of models that characterize variations for integrated circuit feature dimensions, wherein the variations are due to interactions between at least a fabrication process and a designed pattern or feature on a section of at least one integrated circuit design;
combining the variations characterized from the plurality of models to generate a conditional distribution, a range or a statistical measure of variation data in one or more geometric parameters of the design.

21. The apparatus of claim 20, wherein the fabrication process utilizes one or more processing tools or flows from multiple fabrication facilities.

22. The apparatus of claim 20, in which the sensitivity of the design to the variations or a statistical characteristic of the variations using one of more distributions is assessed, wherein the variations include the range, maximum values, minimum values, standard deviation or mean.

23. A non-transitory computer usable medium having a set of stored instructions, an execution of which by a processor causes a process to be perform, the process comprising:
identifying a plurality of models that characterize variations for integrated circuit feature dimensions, wherein the variations are due to interactions between at least a fabrication process and a designed pattern or feature on a section of at least one integrated circuit design;
combining the variations characterized from the plurality of models to generate a conditional distribution, a range or a statistical measure of variation data in one or more geometric parameters of the design.

24. The medium of claim 23, wherein the fabrication process utilizes one or more processing tools or flows from multiple fabrication facilities.

25. The medium of claim 23 further comprising assessing the sensitivity of the design to the variations or a statistical characteristic of the variations using one of more distributions, wherein the variations include the range, maximum values, minimum values, standard deviation or mean.

26. An apparatus comprising:
a processor to:
identify a plurality of models that characterize a variation in integrated circuit feature dimensions resulting from interactions between one or more fabrication processes and designed patterns or features on a section of one or more integrated circuit designs;
provide a context or environment with the section and the multiple models to simulate interactions between the section and the context or environment; and
combine a plurality of data associated with the variation characterized from the plurality of models to generate a conditional distribution or a statistical measure of variation data in one or more geometric parameters wherein the variation data comprises at least one of maximum, minimum, mean, range and standard deviation values.

27. The apparatus of claim 26, wherein the processor to compare or select one or more fabrication facilities or sources.

28. The apparatus of claim 26, wherein the processor to characterize geometric shapes or elements that compose a critical net and form a variation description of the net, wherein the variation description comprises at least one of statistical distribution, maximum and minimum geometric or shape parameter.

29. A non-transitory computer usable medium having a set of stored instructions, an execution of which by a processor causes a process to be perform, the process comprising:
identifying a plurality of models that characterize a variation in integrated circuit feature dimensions resulting from interactions between one or more fabrication processes and designed patterns or features on a section of one or more integrated circuit designs;
providing a context or environment with the section and the multiple models to simulate interactions between the section and the context or environment; and
combining a plurality of data associated with the variation characterized from the plurality of models to generate a conditional distribution or a statistical measure of variation data in one or more geometric parameters wherein the variation data comprises at least one of maximum, minimum, mean, range and standard deviation values.

30. The medium of claim 29, further comprising comparing or selecting one or more fabrication facilities or sources.

31. The medium of claim 29, further comprising characterizing geometric shapes or elements that compose a critical net and form a variation description of the net, wherein the variation description comprises at least one of statistical distribution, maximum and minimum geometric or shape parameter.

* * * * *